United States Patent [19]

Card

[11] 4,149,200
[45] Apr. 10, 1979

[54] TRANSDUCER POSITIONING SYSTEM

[75] Inventor: Daniel C. Card, Winnipeg, Canada

[73] Assignee: Burroughs Corporation, Detroit, Mich.

[21] Appl. No.: 847,012

[22] Filed: Oct. 31, 1977

[51] Int. Cl.² ................. G11B 21/10; G11B 5/012
[52] U.S. Cl. ........................... 360/77; 360/75; 360/98; 360/135
[58] Field of Search ............... 360/75, 77, 78, 135, 360/98-99, 27; 318/567-568, 653, 638

[56] References Cited

U.S. PATENT DOCUMENTS

| 3,691,543 | 9/1972 | Mueller | 360/77 |
| 3,812,533 | 5/1974 | Kimura | 360/77 |
| 3,860,861 | 1/1975 | Gucker | 360/75 |
| 3,959,820 | 5/1976 | Braun | 360/77 |
| 3,994,016 | 11/1976 | Moghadam | 360/77 |
| 4,027,388 | 5/1977 | Kril | 360/135 |
| 4,032,984 | 6/1977 | Kaser et al. | 360/135 |
| 4,068,267 | 1/1978 | Inouye | 360/75 |

OTHER PUBLICATIONS

IBM Tech. Disc. Bull., Lewkowicz et al., Tri-Bit Servo Detection, vol. 19, No. 3, Aug. 1976, pp. 810-813.

Primary Examiner—Alfred H. Eddleman
Attorney, Agent, or Firm—John J. McCormack; Nathan Cass; Kevin R. Peterson

[57] ABSTRACT

Principal embodiment teaches method and apparatus for radial positioning of a magnetic recording transducer relative to the concentric tracks of a rotatable magnetic disk having work data and servo data interspersed in alternate sectors along each track. The servo data sectors comprise repeating groups of servo tracks used to provide coarse and fine radial positioning signals for the transducer relative to the work data tracks.

The servo system control hard-positioning carriage means [to seek target track and keep transducer gap "centered" during Reading and Writing operations] and also provides timing information (synchronized clock signals, timing-decode) determined by the drive, rather than external means. An "embedded" format, rather than "dedicated", is used for laying down the servo information.

6 Claims, 30 Drawing Figures

TRANSITION AT CELL TIME A = "1"
TRANSITION AT CELL TIME B = "0"

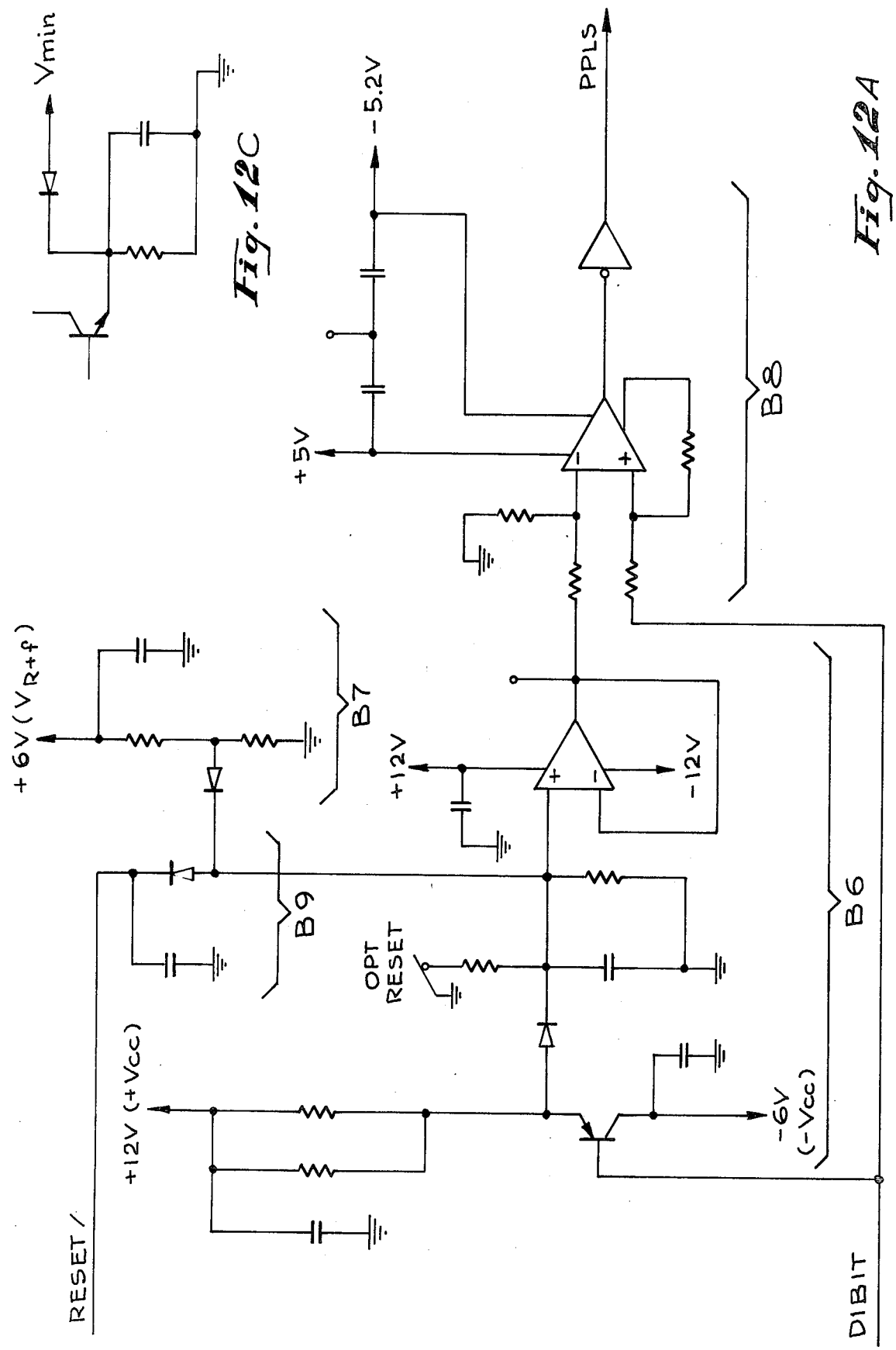

Fig. 15B (C-6)

TRANSDUCER POSITIONING SYSTEM

BACKGROUND, FEATURES OF INVENTION

The present invention relates generally to information recording and/or reproducing systems; more particularly it relates to improved methods and means for positioning a transducer relative to a moving medium. The following U.S. Patents are of interest with respect to transducer positioning (servo) systems; U.S. Pat. No. 4,032,984 to Kaser; et al.; U.S. Pat. No. 4,027,338 to Kril; and the references referred to in these patents.

The present invention will be understood as commonly useful with magnetic disk recording and reproducing systems wherein one or more read/write heads are employed as transducers. Such systems are typically employed to provide auxiliary data storage in an automatic data processing system — with the data being recorded on in a plurality of concentric circumferential tracks about the disk. The data in any particular track is read by positioning the associated read/write head radially of the disk so as to register with this track. Preferably the track number is verified before a transducing operation begins.

Preferably, such a head is, here, to be understood as positioned in two-steps; first, by invoking a "coarse" positioning sequence (also referred to as "track seeking") to move the head to a radial position within close proximity of the target track; then, invoking a "fine" positioning sequence to bring the head into precise registry with the target track and maintain this alignment (also referred to as "track following") while transducing along that track.

Workers in the art are familiar with various methods for such coarse and fine positioning — such as the methods described in the above referenced patents. For instance, workers have used specially selected servo encoding patterns recorded along servo-sector portions of each track to indicate such coarse and fine positioning signals. Each such servo sector may contain a servo code including: a common reference transition, followed by "track-follow" servo data (e.g., for providing fine positioning with respect to two adjacent tracks); this followed by "track-seek" servo data to control coarse positioning of the transducer head.

The present invention involves improvements in such servo methods and means; improvements particularly apt for an "embedded" servo format (e.g., see cited patent to Kril) — as opposed to a "dedicated" (sector or track) format. Workers will appreciate that an "embedded" format presents difficult problems as track density and/or bit density are increased. This invention addresses those problems.

More particularly, the instant features will be seen as apt for implementing certain servo data format. In this format, the fine servo data which comprises a "reference transition" followed by another opposite polarity transition at either a first or second position of each track depending on whether the track is odd or even — thus recording an odd or even indicium at respective different relative located positions on adjacent tracks. And, in such a format, the coarse servo data comprises a track-group identification code in a series of successive data cells, each cell containing a single magnetic transition representing either a binary "0" or "1" depending on whether the transition occurs in the first or second half of the cell. Preferably, this coarse pattern employs a specially chosen sequence, such as a Gray code sequence, permitting only one change in the (magnetic transition) code between adjacent tracks. Also, such a code is preferably laid-down and manipulated, so that a "between track" condition is readily detectable, and results in detected pulses being obtained in both the first and second portions of the "changed cell".

Workers will understand that preferred embodiments of this invention will provide a high performance, high capacity, low cost (per megabyte unit) system; one able, for instance, to multiply the data capacity of a conventional disk storage system. Workers will also appreciate that these advantages are achieved using relatively conventional, readily available subsystems. For instance, disk systems improved by the taught features will be seen to provide a very high level of real bit density (for a "several hundred megabyte" capacity, the order of several megabytes, or more, per square inch) — preferably in a configuration of relatively compact overall size and of very reasonable cost (e.g., one to two dozen cubic feet and costing just a few dollars per megabyte), along with very reasonable access-to-data times (e.g., the order of about three dozen ms.).

DESCRIPTION OF THE DRAWINGS

The foregoing and other objects, features, advantages and uses of the invention will become apparent from the following description of preferred embodiments, taken in conjunction with the accompanying drawings wherein like reference symbols denote like elements and in which:

FIG. 10 shows a "servo control-linear motor" portion of the elements of the FIG. 3A embodiment in block diagram form, while preferred detailed circuit implementation of the arrangement of FIG. 10 is given in FIGS. 13A, 13B, and FIG. 14; and that for FIG. 8 is given in FIGS. 12A–12F and that for FIG. 9A given in FIGS. 11A, 11B; while

DESCRIPTION OF PREFERRED EMBODIMENTS

Figure 1:
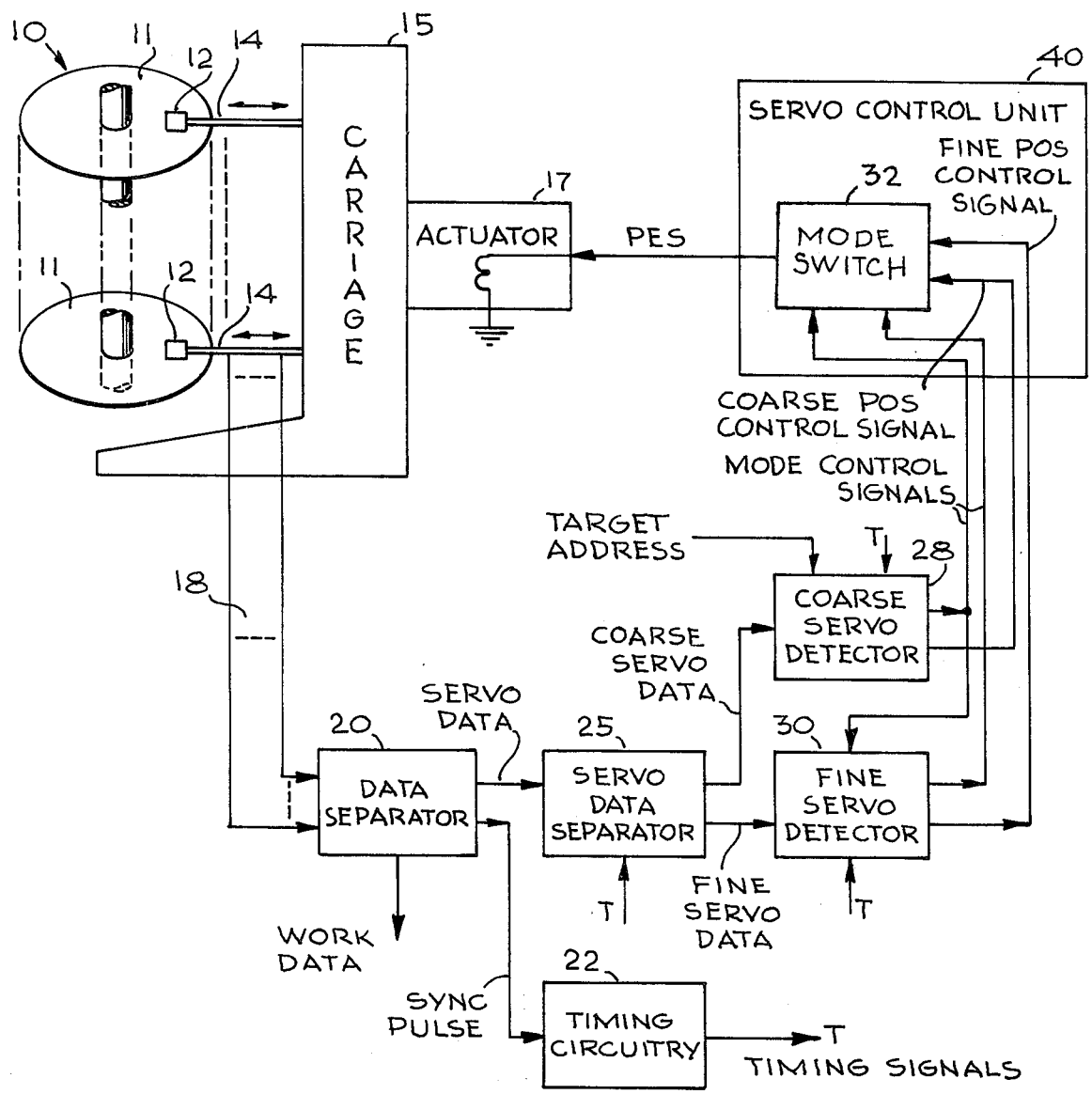
FIG. 1 depicts a known disk drive arrangement showing various data handling and actuator control functions in block diagram form; with FIG. 2A showing, in plan view, a fragmentary schematic illustration of an associated magnetic recording disk, with data format indicated.

Workers will understand that, except as otherwise expressed herein, elements will be understood as constructed and operating conventionally and as known in the art. Referring now to FIGS. 1 and 2, attention will first be called to a magnetic disk recording system of a known type, such as referred to in the cited U.S. Patents. This system will be seen as comprising a disk pack 10 including one or more rotatable disks 11, each having a respective radially-positionable magnetic transducer head 12 provided and operated as known in the art.

Each disk 10 contains a plurality of concentric annular tracks. As illustrated in FIG. 2, work data and servo data are interpersed on the disk so as to form alternating "work data" sectors and "servo data" sectors. The servo data on each disk is provided to control the radial positioning of the respective disk head 12 in order to permit accessing selected work data tracks for reading and/or writing; for example, as is conventionally performed when a disk system is employed as a peripheral storage unit in a computer system. For the purpose of this description it may be assumed that all of the heads are constructed and arranged to move together, but it will be understood that the present invention could also be applied to a disk system wherein the heads are individually moveable. It will also be assumed that only one head and a corresponding disk is selected for reading and/or writing at any one time.

Now, workers will appreciate that, a head positioning carriage 15 is constructed and operated conventionally, being controlled by an actuator 16 that provides for radial positioning of the heads 11. The actuator 17 is, in turn, controlled in response to a positioning control signal indicating the "current position" of the head relative to the "target position". More specifically, and as schematically illustrated in FIG. 1, data signals read from disk 11 by a selected head 12 are applied, via lines 18, to a Data Separator unit 20 adapted to separate servo and work data based on sector location, and for providing a "sync" signal is applied to a timing circuitry 22 for producing a group of timing signals T in a conventional manner (for application to other elements of the system).

Conventional servo control (FIG. 1):

As detailed in the cited patents, the servo data recorded in each track's servo sectors may comprise a common reference transition followed, first, by "Fine Positioning" signals FP; then, by "Coarse Positioning" signals CP. This servo data passes Data Separator 20 and is separated into coarse and fine positioning data, for application to associated servo means. (See Coarse Servo detector 28 and Fine Servo detector 30). Because the fine and coarse servo data occupy different discrete portions of a disk track, the servo data separator 25 may typically comprise conventional gating circuitry responsive to appropriate timing signals T — thus separating the detected coarse and fine servo data based on the time-intervals therebetween (as known in the art).

If the transducer position is to be shifted from one work data track to another, in this embodiment, the Coarse Servo detector 28 operates in response to a received "target address" as well as the detected coarse servo data applied by the servo data separator 25 — and is thus controlled to bring head 12 into approximate alignment with the target track. More specifically, this Coarse Servo detector 28 accomplishes coarse positioning (also called "track seeking") by employing the coarse servo data read from the current track in conjunction with the target address to produce a coarse DIFFERENCE COUNT (e.g., TRACK DIFFERENCE signal "TD", whose value equals the number of tracks to be crossed; while polarity (±) indicates direction — i.e., Fwd/Rev — Note: with about 100 servo fields and with disk rpm at 4000 rpm, about 5000 "TD" signals issued per second). This signal is applied, via a mode control switch 32, to the actuator 17 for appropriately moving the head positioning carriage 15.

When the Coarse Servo detector detects that the head has been brought into approximate registration with the target track, a "mode control signal" is produced which activates the Fine Servo detector 30, while also switching the mode switch 32 to now apply the output of detector 30 to actuator 17 (a fine position control signal). Fine Servo detector 30 may be of a well known type, such as disclosed, for example, in the aforementioned U.S. patents. It operates in response to the fine positioning data provided by the servo data separator 25 to control the alignment of head 12 with the target track (near which it was "approximately positioned" by Coarse Servo detector 28), and to maintain this accurate alignment until repositioned to a new target track.

Figure 4:
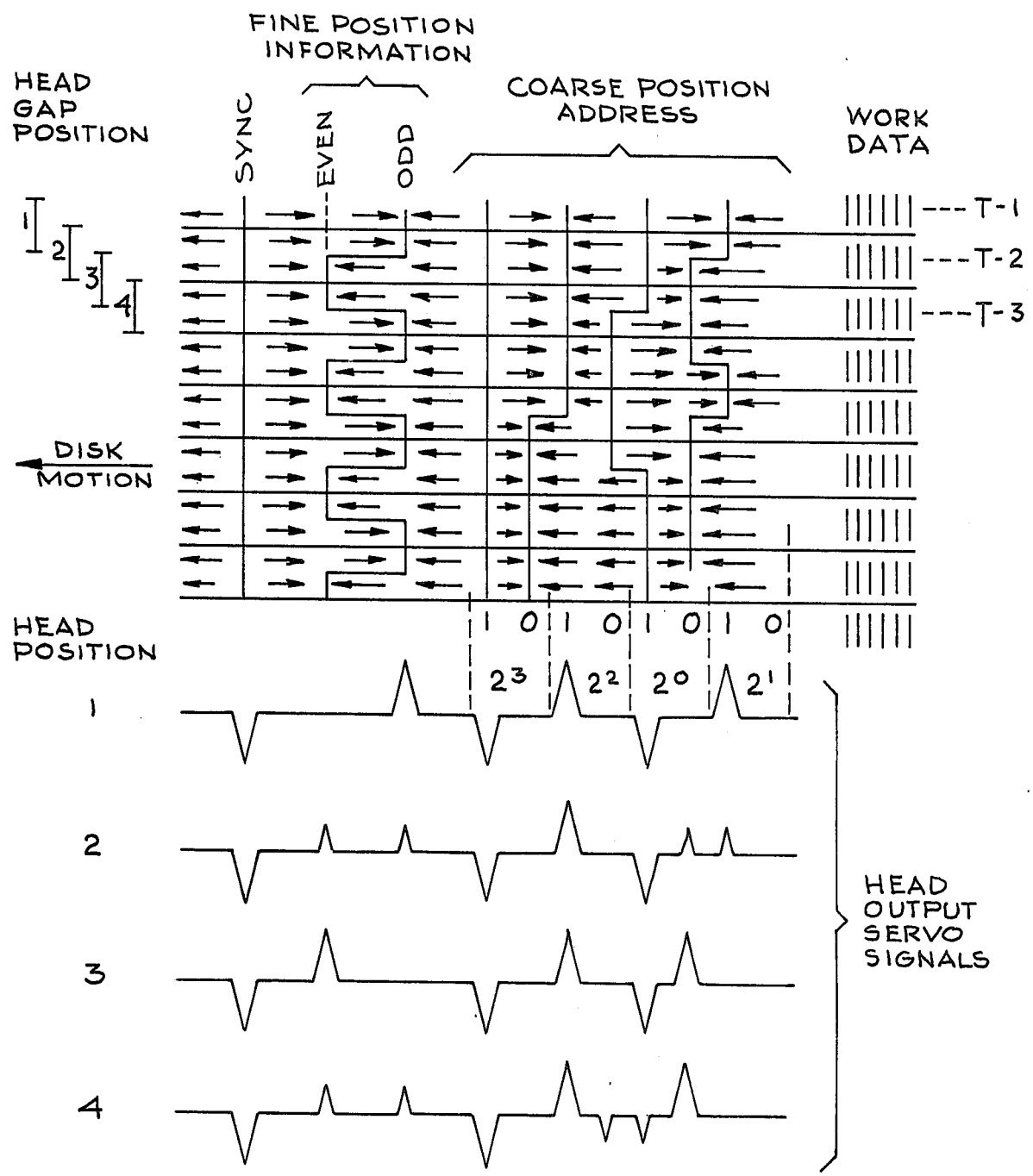
FIG. 4 depicts, very schematically, an exemplary set of servo recordings and associated read-out pulses for four transducer positions.

"Embedded" servo recordings (FIG. 4):

Workers will recognize that arrangements of the type indicated in FIGS. 1 and 2 may be advantageously implemented using servo techniques where the head position information is pre-recorded directly on the disk (e.g., as opposed to systems having a separate servo track or servo disk( — thus affording considerably improved head-positioning accuracy. FIGS. 2B, 2C and 4 show an example of a related "embedded" servo data encoding scheme whereby position information may be pre-recorded on each disk track in the servo data sectors preceding each "work data sector". This servo information is, of course, available to the servo system only periodically, when the servo pattern passes under the associated head, and thus may be characterized as a "sampled data control" servo system, where the sampling rate depends upon disk rotational speed and the number of sectors per rotation.

Figure 2A:
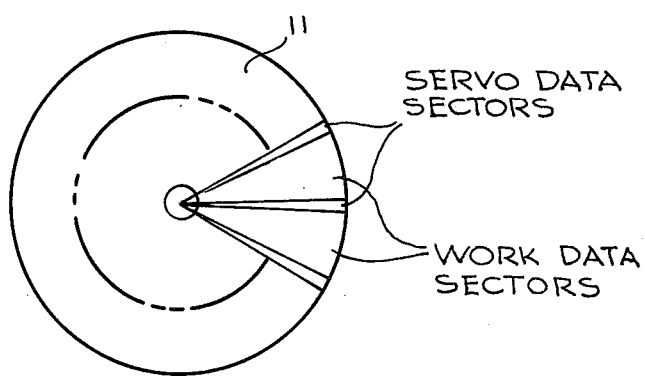
FIG. 2B shows an enlarged portion of a servo sector thereof, with associated read-out pulses illustratively indicated in FIG. 2C, in di-bit form, according to the invention.
Figure 2B:
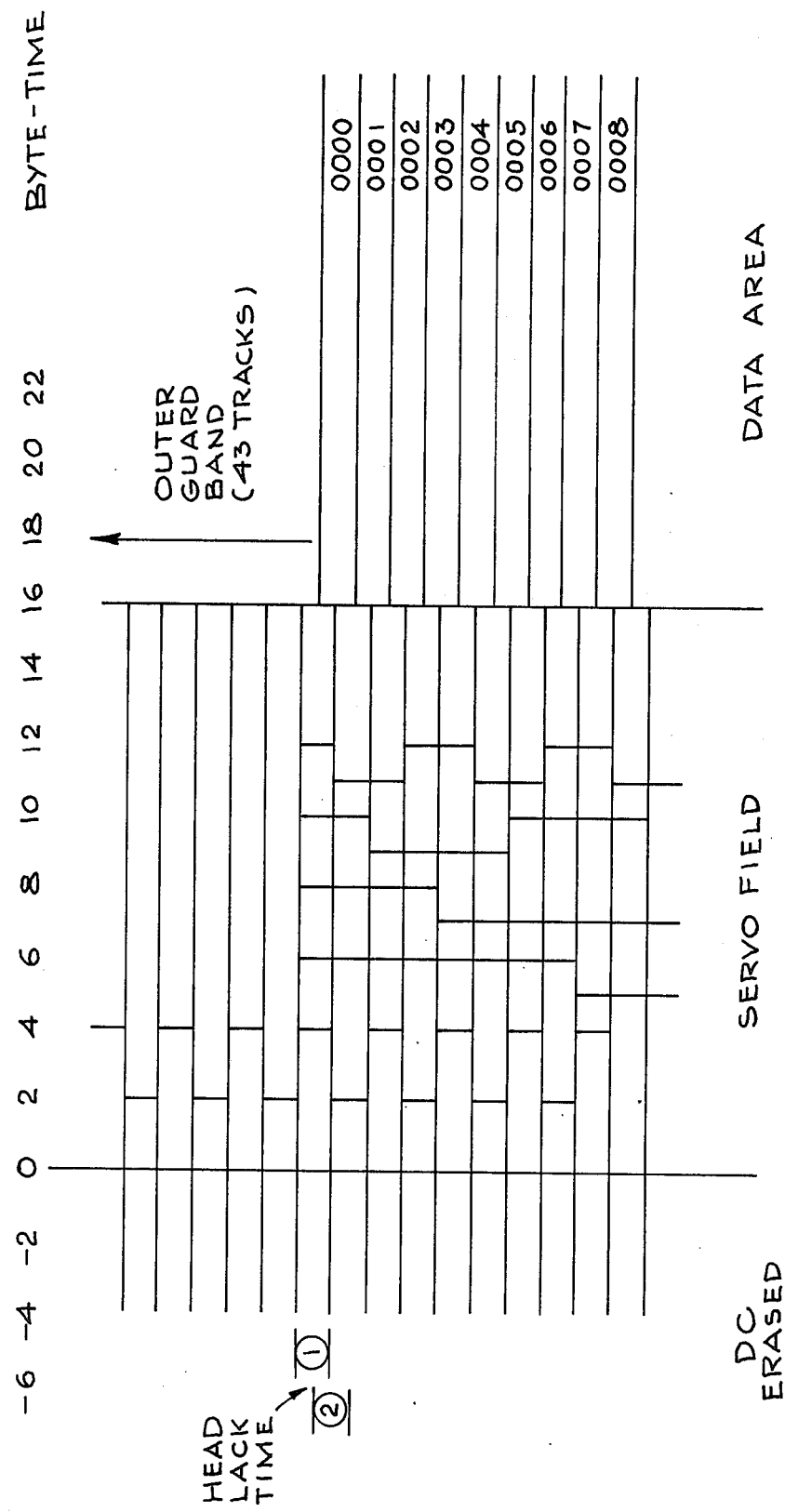
Figure 2C:
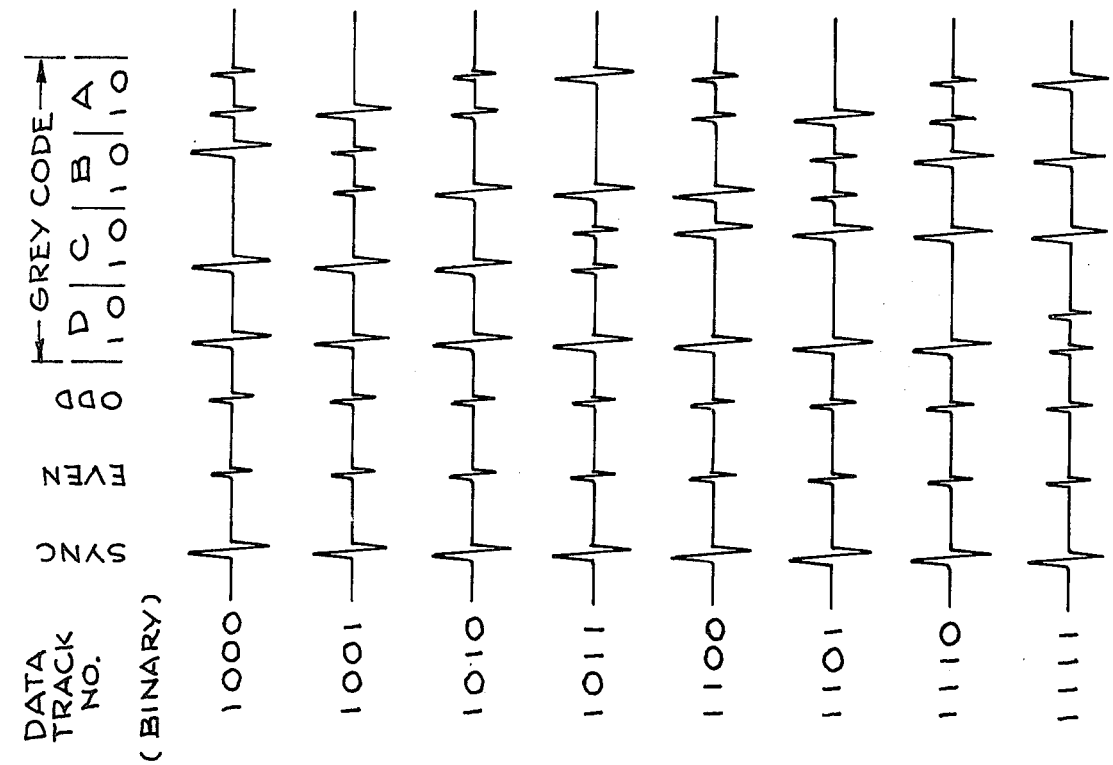
Figure 2C:
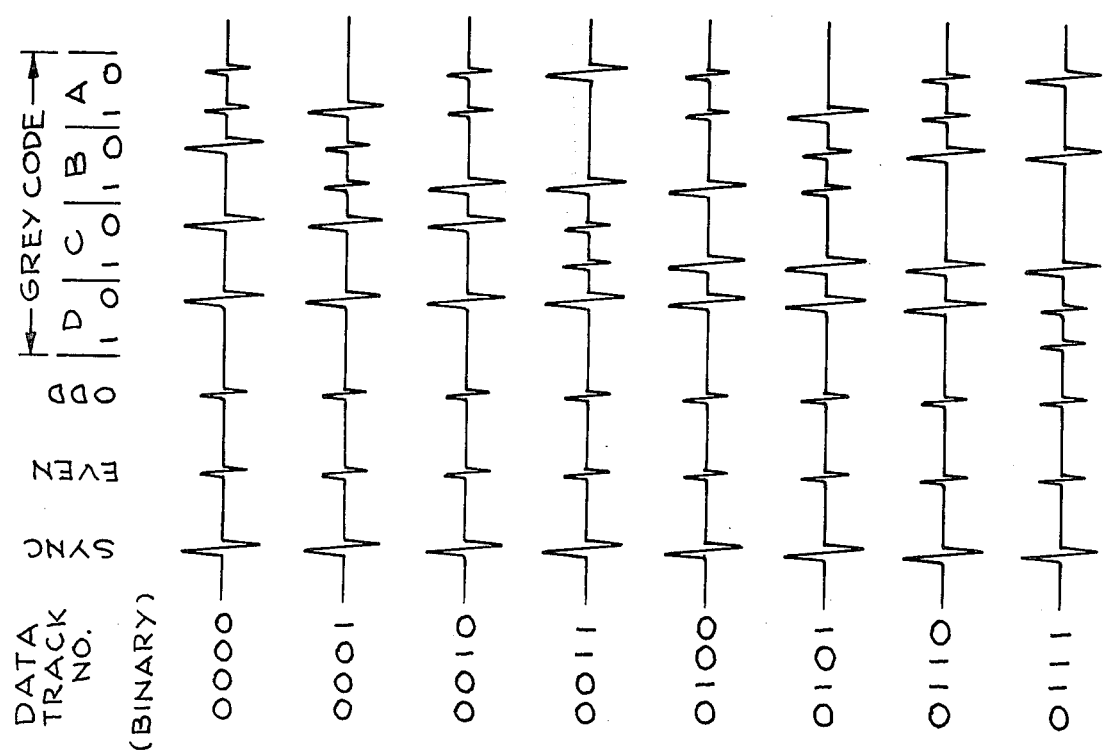

FIG. 2B is an enlargement of a portion of FIG. 2A schematically illustrating the relative arrangement of some sample servo tracks (in a given sector) and adjacent (work) data tracks (0000–0008); with a pair of illustrative transducer heads #1, #2 shown as "registered" and "straddling" servo tracks, respectively.

FIG. 2C is a representative showing of encoded dibit read-out (servo) signals, according to this invention, from some sample tracks.

FIG. 4 shows a set of illustrative, radially-adjacent servo sectors in conjunction with four illustrative (head) gaps; each disposed at slightly different, "staggered" positions relative to tracks T-1, T-2, T-3. Also, the relevant servo signal output for each position is indicated by typical fine and coarse servo signals placed below as associated transitions on these tracks. The arrows in FIG. 4 will, of course, be understood to schematically indicate the magnetic polarity of the magnetization on each side of the magnetic transition which is indicated by a vertical line along the respective disk recording track.

Thus, each set of servo signals will be seen to generally comprise a timing or "sync" signal; "fine" position information and "coarse" position address. This "sync"

pulse occurs at the beginning of each servo pattern and will be understood as the time reference for all timing information. Its amplitude will be independent of head position generally speaking. The "fine" position information will be seen as derived from the relative amplitudes of the even and odd pulses representing radially adjacent even and odd recording tracks (head-gap position #2 being understood as "registered" along an odd recordng track and position #1 registered along an even recording track; whereas positions #1 and #3 are understood as "offset" or straddling, midway between tracks.

Convertionally, the "sync" pulses will be understood as unipolar, whereas the following "fine" servo pulses are of opposed polarity — these functioning as "fine positioning pulses" indicating whether the registered track is "odd" or "even", according to whether their occurrance is "early or late" as referenced to the "sync" pulse.

Thus, the "fine" position information is derived from relative amplitudes of the even and odd pulses with the gap "registered" exactly along a data-track center-line, the two pulse heights will be ("ideally") equal; whereas in the intermediate, "straddling" position only one or the other of these pulses, alone, will occur (i.e. will have relatively significant amplitude).

As to the "coarse" position address information, it will be seen that the four least significant bits are contained in the remaining pulses (following the fine position information) these being seen as in "pulse-position" format using "Gray code". Coarse servo position information is preserved as long as the head stays within a given sector sample — there being four illustrative coarse position data cells shown, each cell being understood as storing a single binary digit, 0 or 1, dependent upon whether a transition occurs in a first or second location within the cell. Each cell contains only one transition period — cell position being time-referenced to the sync pulse. As mentioned above there are four such coarse servo cells illustrated here: "$2^0$, $2^1$, $2^2$, and $2^3$". When the gap is on center line, its coarse servo signal output will be recognized as comprising three "full-amplitude" pulses and two "half-amplitude" pulses (gap positions #2 and #4, as above); whereas the "straddle" locations (positions #1, #3) are represented by four full-amplitude pulses.

Figure 5:
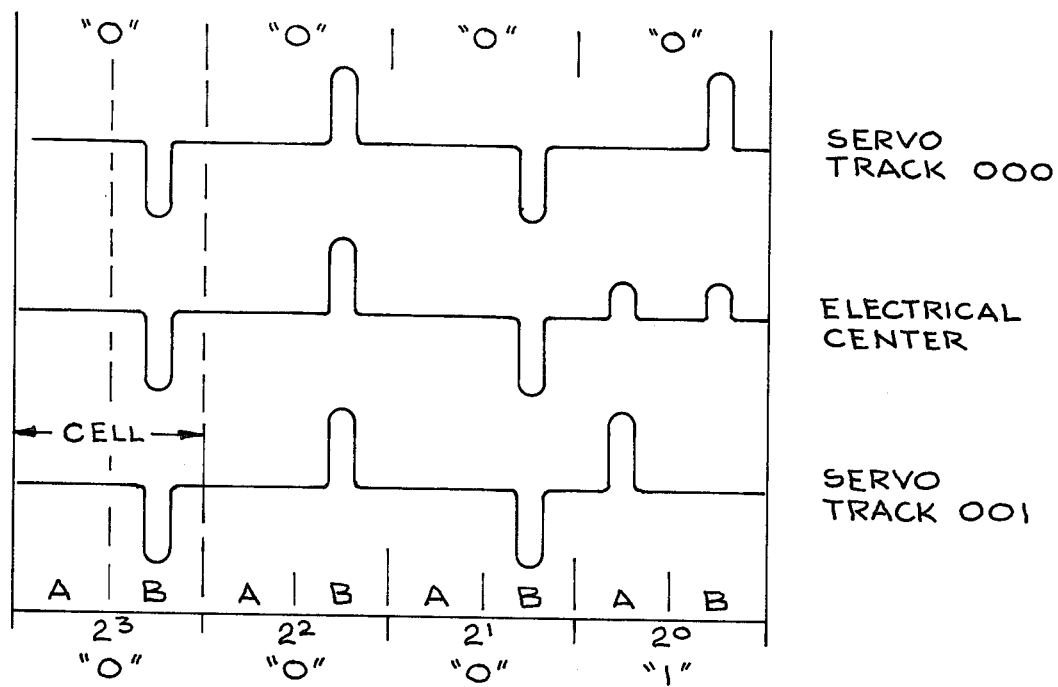
FIG. 5 depicts sample "seek" pulses according to the preferred code.

FIG. 5 is an expanded representation of the coarse position data output for two representative adjacent servo tracks (track 0000 and track 0001), these comprising four "bits" which are found in four data cells identified as $2^0$, $2^1$, $2^2$ and $2^3$). Each bit comprises a binary "zero" or "one" when occurring in the early (or "A") half of the cell or a binary "0" when occurring in the later (or B) half of the cell, as well understood in the art. These four bits will be understood, furthermore, as preferably recorded as a pulse-position-encoded "Gray code" which will identify one of 16 "disk cylinders" (in this example) in a repeating group. This information is also preferably applied in a coarse-positioning mode, such that the four-bit designation, once decoded, may be used to update a difference counter during "seek" operation. Track identification occurs at "sync" time providing position feedback in this mode.

Figure 3A:
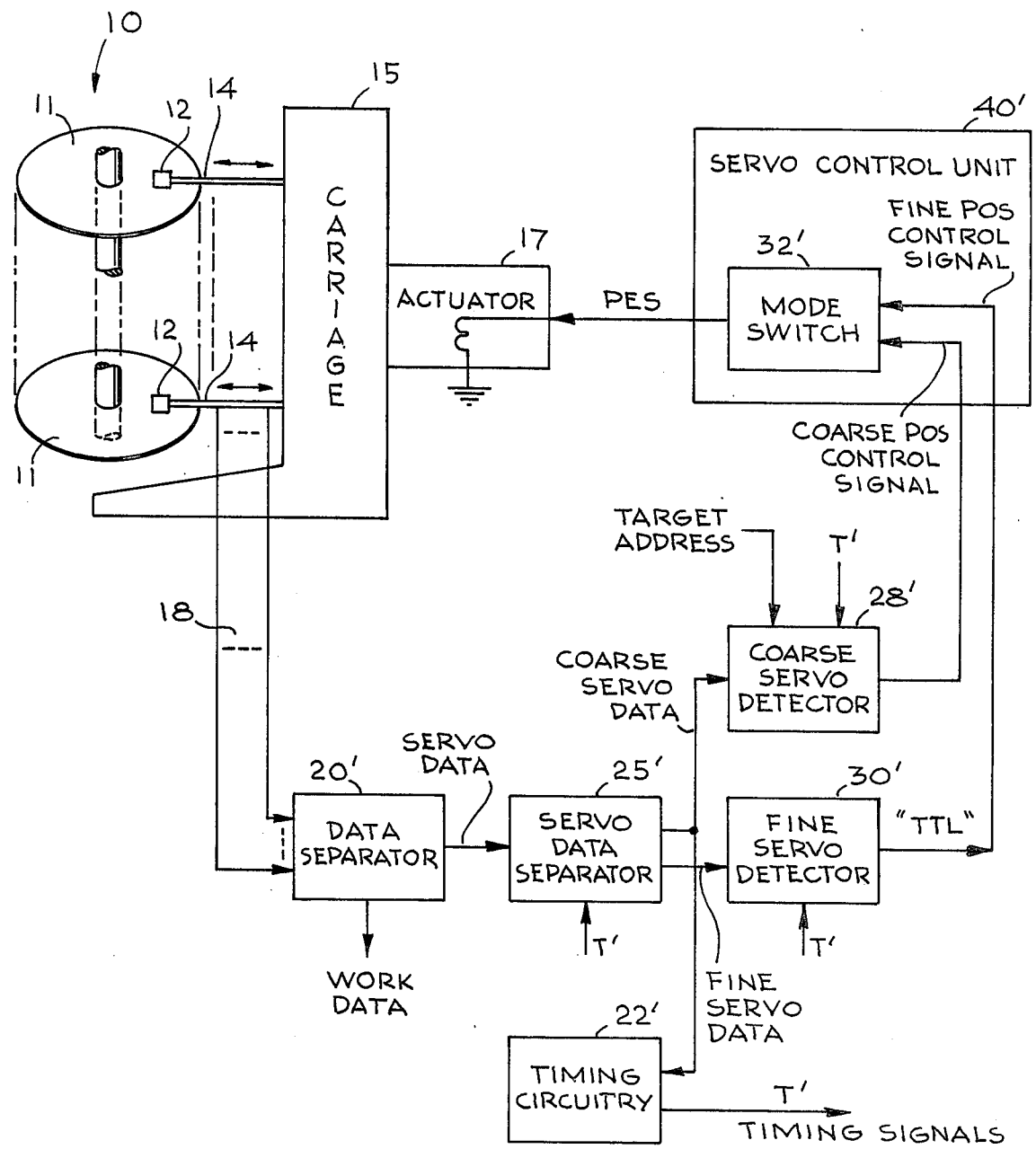
FIG. 3A depicts an embodiment in the manner of FIG. 1 but modified with the invention.
Figure 3B:
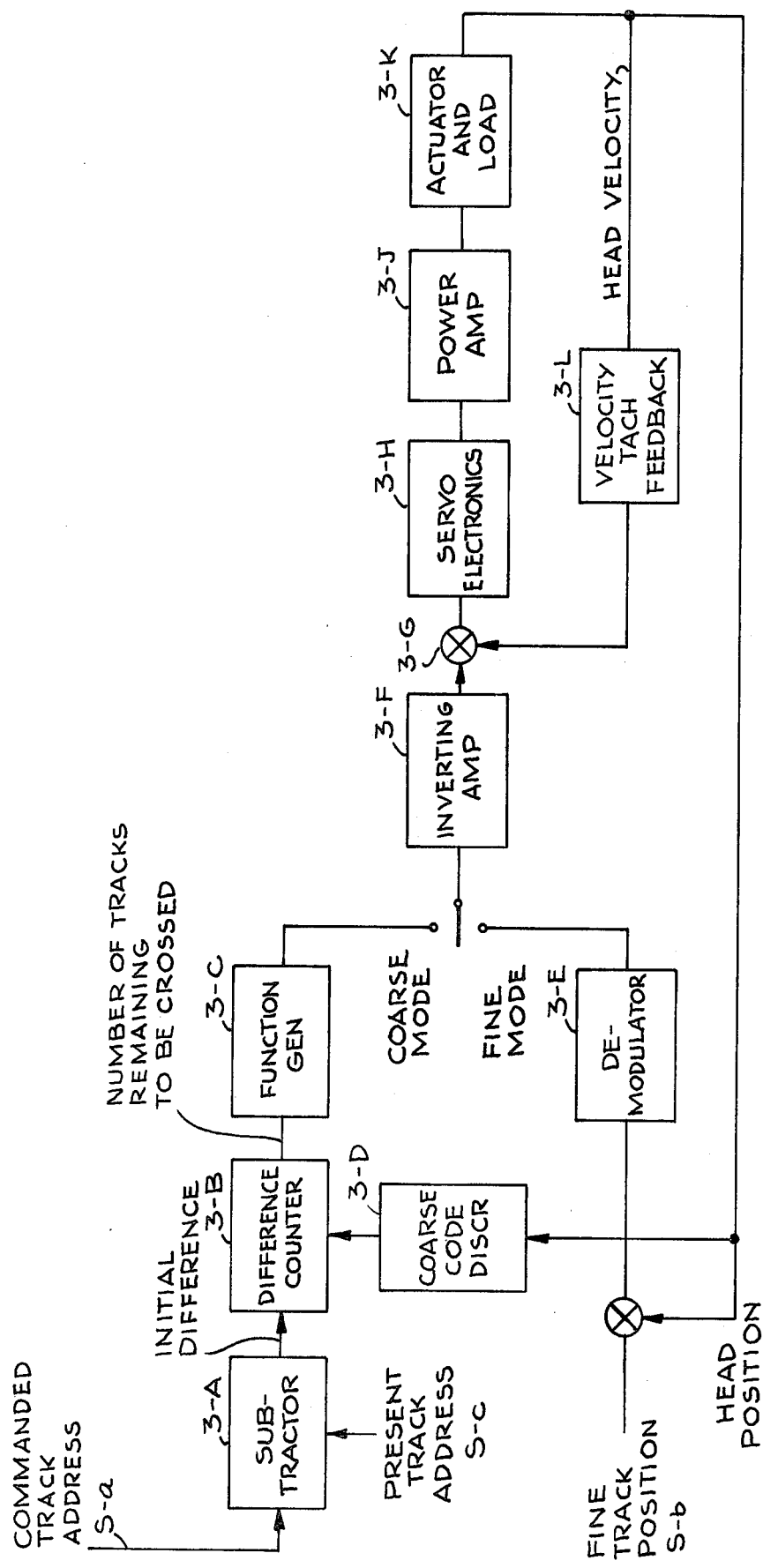
FIG. 3B shows a block diagram of a related disk servo system.

Servo system (FIG. 3):

A servo system implementing the foregoing servo encoding scheme is indicated in functional block diagram form in FIG. 3A, with FIG. 3B showing the fine and coarse positioning loops functionally. Workers will understand the construction and operation of the indicated system to be conventional except to the extent otherwise indicated. This system will be understood as conventional and operating as the like system in FIG. 1 except where otherwise indicated.

More particularly, in some systems, when the servo controller commands a new cylinder address, the subtractor will compute a number of "tracks to be crossed" (to reach the new cylinder address) and load this number into a difference counter (3-B — see FIG. 3B). Counter 3-B is decremented by the number of tracks that the head crosses as it moves to this new cylinder, and the output of the difference counter represents the number of tracks remaining to be crossed (the "discrete position error"). This number is converted to an error voltage and is used to control transducer velocity as it moves to the target track. When the difference counter output reaches zero, the target cylinder has been reached and the position error of the servo system is switched from the output of the function generator 3-C (coarse mode) to the output of the position demodulator 3-E (fine mode) whose output voltage is a function of the distance from the data track center line.

FIG. 3A indicates the servo detect system [37 fine", and "coarse"] rather generally and functionally. Here, it will be understood that the "fine" position control signals are applied to the servo control unit 40' from a Fine Servo detector 30', operated, under the control of timing signal T'. Similarly, a Coarse Servo detector unit 28' applies "coarse" position control signals to unit 40' under the control of timing signals T' and of a "target address" signal from a control unit (not shown). The "coarse" and "fine" servo data signals are separated from work data at unit 20' and segregated from one another at separator unit 25'. Timing stage 22' generates these timing signals T' responsive to a prescribed aspect of the "coarse" servo data pulses, "PPLS", as indicated below.

head positioning is accomplished by a closed-loop, sampled data feedback servo system. The head positioning carriage will be understood as preferably driven by a voice coil linear actuator controlled by the associated servo system. Position feedback will be understood as obtained by sampling the selected read/write head at the time the servo information is directly under the head gap.

It will further be understood that there are a prescribed number (e.g., 1 to 2,000) information tracks per disk and that the access mechanism will be electronically detented to any number of discrete track-registry positions, one for each track — to provide access for the eight read/write data heads (one for each disk surface). Each such detented position thus provides an eight-track(one track per data surface) cylinder of information. In the "seek" or coarse head positioning operation, the eight read/write heads will be conjunctively translated to the track position corresponding to the target cylinder address specified by external controls.

Here, servo data will be understood as "embedded" at prescribed sectors around each track, to be detected by the appropriate transducer 12, which applies an associated servo data output along the appropriate connecting lines 18 to data separator stage 20' where position data "servo data" is separated from the work data, and applied to a position converting stage 25. Converter 25 operates to convert this position data into the above-mentioned transducer positioning signal $V_R$, indicating the actual radial position of the subject transducer in question. Converter 25 also generates a control signal "PLP" and applies it to a logic stage as later described.

Actuator stage 17 preferably comprises a voice-coil actuator or other known linear motive means. Workers will understand that a velocity transducer may readily be combined with the actuator array 17 to generate the mentioned transducer velocity signal $V_V$. The magnitude of the total difference count applied to the actuator may also be used in certain cases as necessary as a measure of the total translation distance for the given transducer (number of tracks crossed thereby).

The interrelation and operation of the elements in FIG. 3A will be better understood by the following brief and general description of how a transducer is located over a target track. This operation may be broken down into a first (coarse positioning) and a second (fine positioning) operation. Initially, a controller unit sends a controller message (CM) serially to the subject disk drive. If CM contains a new track address and accordingly prepares to "seek" to this new track and calculates the difference between the new and current track addresses, to determine the number of tracks the head must cross to reach the target track (note the "CAR", or cylinder address register signal, applied to logic unit 10-B). If this "difference count" is positive, a forward (or inward) seeking is enabled; if the difference is "negative", a reverse (or outward) seeking is enabled; and if the difference count is "zero", no seek operation is enabled at all. Logic unit 10-B, in conjunction with other associated signals, then causes control unit 40' to initiate a "seek" to the new track by an appropriate output TD, applied to appropriately energize actuator 17. When the actuator has completed this seek translation, a drive message DM will be issued to the drive controller confirming completion of the seek operation.

According to a related feature and using means known to those skilled in the art and forming no part of this invention, actuator 17 and control unit 10-A provide a seeking velocity that starts directly proportional to the magnitude of the difference count, bounded by a maximum velocity, if the seek is longer than a certain nominal track span. This velocity being controlled by feedback from a velocity transducer (such as a tachometer rod and coil well known in the art) in the linear motor of actuator 17 fed back as velocity signal $V_V$. Each time the head crosses a track, a clock pulse will be generated to reduce the difference count by one. Maximum velocity will be maintained until the difference count falls below the nominal track span, after which the drive signal to the servo system will be reduced proportionally with the linear motor responding to balance out the signal with the output of the velocity transducer. This results in a braking voltage applied to the linear motor which will act to slow the heads as they approach the correct track and a difference count of zero. When the difference count is reduced to zero, the head will be within a specified range of the desired track (e.g., about 0.5 mils or less) and the servo control unit will switch from coarse positioning to fine positioning or track-following mode as controlled by the mode switch 32 (FIG. 3A). The servo system then picks up the di-bit signal of the specific track it happens to be registered with and continuously executes a fine positioning adjustment until the next seek CM is received.

Exemplary Disk Drive

Systems according to the present invention described herein will be particularly suited for a certain improved type of disk drive. Such drives may be "single module", or preferably, "dual module", having one spindle per module and four fixed "non-removeable" disks per spindle. All eight recording surfaces may be used for data storage with servo information interspersed among the work data. (preferably at the sector boundaries). The servo information will preferably form part of a closed-loop, proportional servo system used to position the drive to one of (several thousand) discrete "cylinder" locations selected by the appropriate associated controller. Controller interface will be in a radial configuration and each unit will be capable of independent operation. Workers will recognize the usefulness of such disk drives and their advantageous characteristics as enhanced by the invention features.

"Di-bit transitions" (FIGS. 6A, 6B and 7A, 7B):

According to one feature hereof, the foregoing scheme is implemented in a prescribed "di-bit" encoding/decoding technique, described as follows, with particular reference to FIGS. 6A, 6B and 7A, 7B.

Figure 6A:
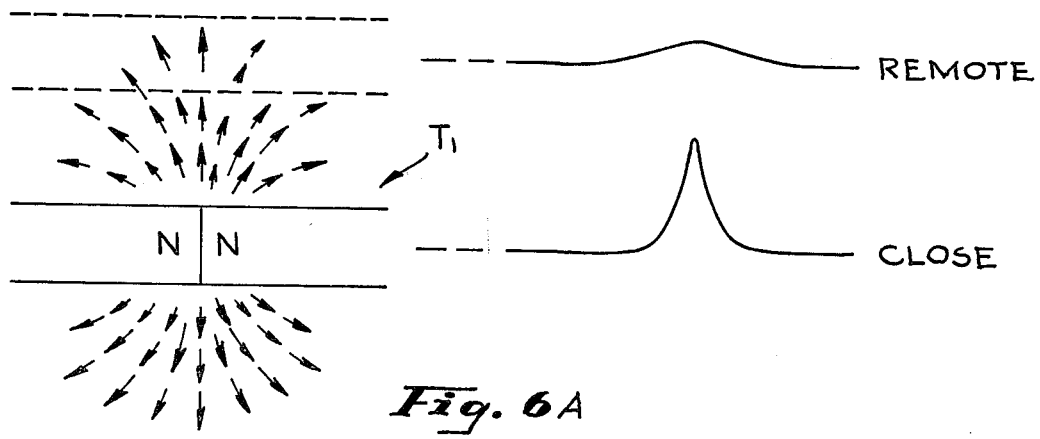
FIG. 6A shows a known Tri-bit transition and associated read-back signals very schematically, with FIG. 6B showing the same for the preferred "di-bit" recording.

FIG. 6A will be understood as representing a recorded magnetic transition of the above-described type (sometimes called a "Tri-bit recording") in a very idealized fashion whereby the abutting like-poles give rise to a rather "divergent", "fringing-field" magnetic flux transition $T_1$. When detected by an associated magnetic gap, such a flux transition provides a "full-amplitude" magnetic read-out pulse when the gap is disposed relatively "close" to the passing medium, and a "partial-amplitude" read-out pulse when it is not really "close" (i.e., when relatively "remove" from the medium; these being read-out pulses illustrated in FIG. 6A). These "partial-amplitude" signals are often problematic, as workers well known — and are avoided with di-bit recording.

Figure 6B:
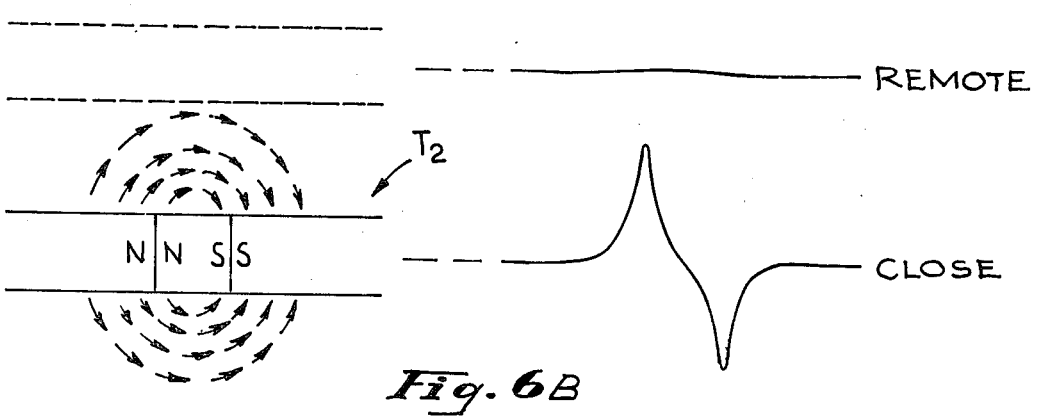

FIG. 6B, by contrast, represents in similar idealized fashion the replacement of such a "Tri-bit" magnetic transition with a double transition — i.e., a di-bit — a "closed-loop" (converging) magnetic transition $T_2, I_2'$, each comprising two abutting, like-polarity magnetic domains, the bulk of whose magnetic flux is confined relatively close to the medium in "closed-loop" fashion. Such $T_1, T_2$ transitions generate reversed polarity output pulses (for each "bit") when the detecting gap is "close" to the media; but give no perceptible output pulse, when the gap is at all "remote" therefrom, as indicated schematically in FIG. 6B.

Workers will be able to translate the merits of such a "di-bit" recording into very practical operating advantage.

Such a Tri-bit recording mode characteristically presenting successive alternating polarity pulses along a track, can give serious problems of adjacent-track interference, as workers know, especially in the case of a misregistered transducer gap. That is, a transducer gap passing along a track adjacent to a Tri-bit, as represented in FIG. 6A, could erroneously pick up its "fringing field" flux and yield an output analogous to that indicated in the "remote" output waveform in FIG. 6A. Such information could be erroneously interpreted as a "bit" and readily avoided with the indicated di-bit mode of recording, especially since the "fringing field" characteristic of a Tri-bit is radically reduced. That is, the field pattern of the di-bit is much tighter and more closely confined (in the closed-loop pattern schematically indicated in FIG. 6B). This will obviously improve transducer resolution, since di-bit field strength drops off radically as a transducer gap moves off "dead center" (over a recording track) — and what little fringing flux there tends to cancel out, even where a gap is offset. Thus, a gap passing "off-center" in an adjacent track will be far less likely to pick up spurious, erroneous signals and recording accuracy and resolution is, of course, improved.

For instance, "adjacent track interference" will be seen as radically reduced, if not eliminated, by this feature. That is, the relatively isolated, "open-flux-loop" Tri-bit transitions (FIG. 6A) lead to interference between adjacent track transitions, as is known, especially in high-frequency recording. Such adjacent track interference is all but eliminated by use of such "di-bits" according to the invention.

Figure 7:
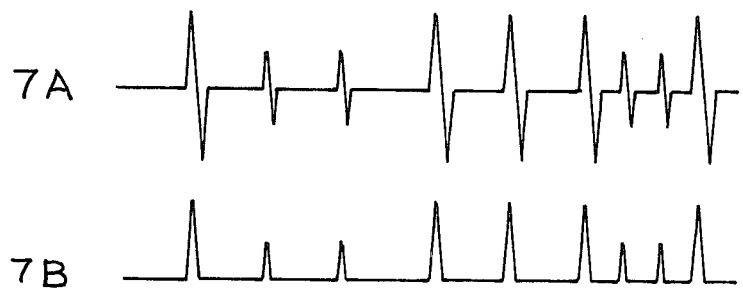
FIG. 7A giving a representative servo read-out pulse train, in di-bit form; these being added and rectified in FIG. 7B.

This adjacent track interference will be seen as a common problem which becomes greatly exacerbated as track density (TPI) increases. For instance, workers in the art are trying desperately to increase TPI from two to four times to meet todays data processing needs.
Preferred read-out pulse mode (FIG. 7 — vs. conventional format):

Turning now to FIG. 7, a servo data output pulse sequence 7A representing illustrative di-bit direct transitions is shown. This pulse sequence will be understood as analogous to the patterns in FIG. 4, as adapted to the di-bit mode.

As indicated the pulses successively represent — in order — the "sync" pulse, plus a pair of "fine" positioning (even/odd) pulses, plus a coarse positioning signal sequence representing the values: "0, 0, 0, T" (where "T" represents a transitional state which is between a "zero" and a "one" state, when a gap straddles tracks "zero" and "one", respectively). These are followed, optionally, by an index pulse ID. Workers in the art will recognize that such a series of di-bit pulse may readily be processed by conventional means to assume other more readily-processed pulses, such as the more conventional uni-polar pulse train 7B.

Figure 8:
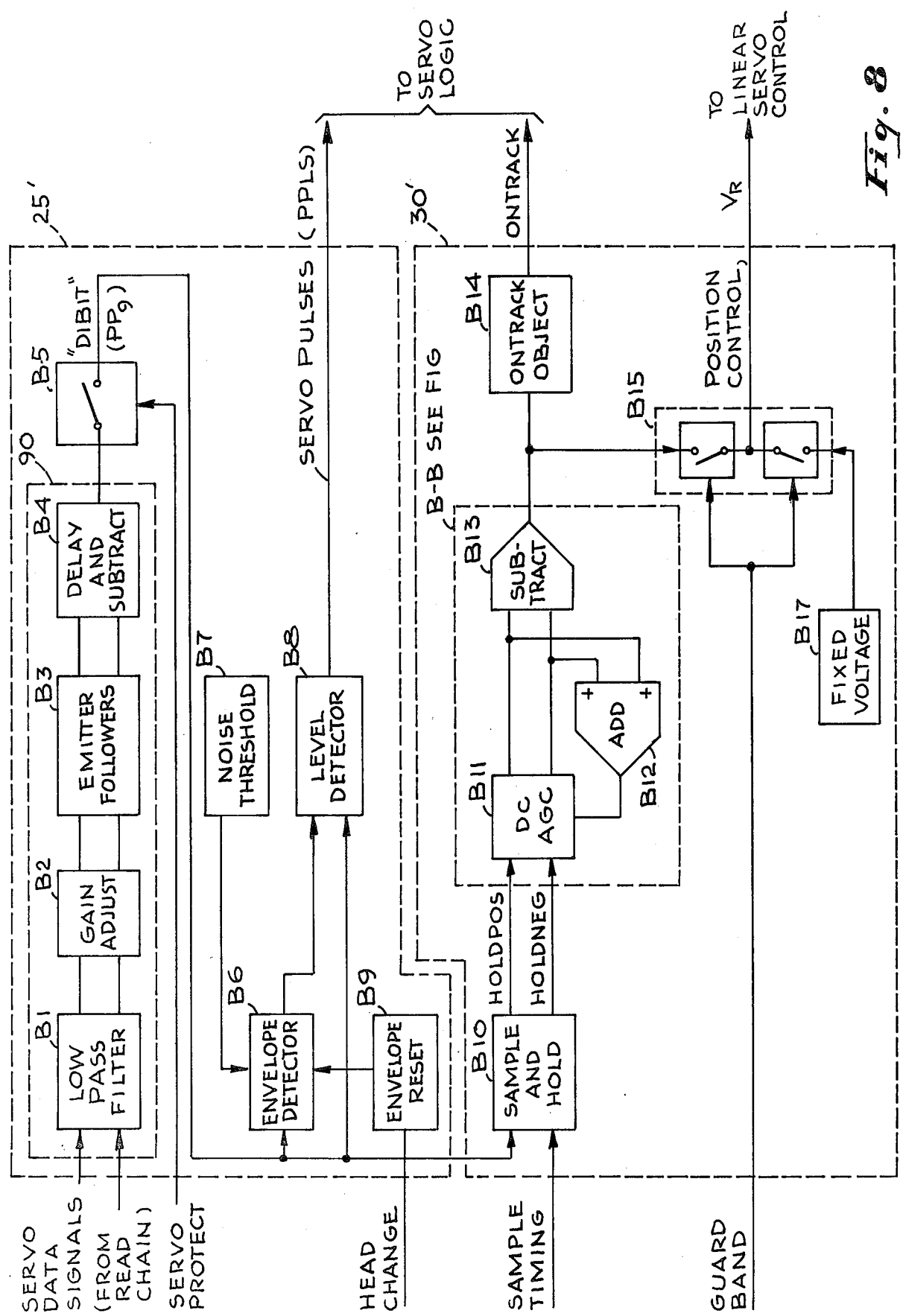
FIG. 8 shows a "servo detect" portion of the elements of the FIG. 3A embodiment as a block diagram, with a preferred AGC array and with a variant of the di-bit detect portion indicated in FIG. 9A and associated waveforms in FIG. 9B.

Servo detection (FIG. 8):

Turning to the block diagram of FIG. 8, here it will be understood tht more particular details of the servo data separator unit 25' and the associated fine servo detector unit 30' in FIG. 3A described above are shown. These combined units will be understood a process servo signals received from the transducers and to produce a logical output signal corresponding to the "servo field". Among other things this arrangement Samples "odd" and "even" pulses and produces a "fine positioning error signal" to be used in the "Track-following" mode (that is, fine servo positioning). The arrangement will also be seen to generate a synchronizing signal (once per sector) used to initially "sync-up" with the servo signals impressed on a disk track. According to one feature, this arrangement combines a di-bit detection circuit 90 with related servo detection means, and is adapted to generate servo control pulses (PPLS to Servo Logic; $V_R$ to Linear Servo Control) discussed below.

Also, included in an Envelope Detector stage B-6, preferably and according to another novel feature (see preferred circuit therefor in FIG. 12A, discussed below).

More specifically, servo data signals received from the "read chain" are applied to a di-bit detection stage 90 (more particularly described in FIGS. 9A and 9B below) from which the servo "di-bit" signals PP-9, discussed elsewhere, are responsively produced. These are gated-out through a servo-protect gate, and solid state clamp B-5, as known in the art. The di-bit signals are then applied to an Envelope Detector stage B-6 functioning as a signal amplitude detector as known in the art (as opposed to a simple AGC circuit; which would lack the capability of this arrangement for compensating for a heat change, when moving from one disk surface to another at the same radial location. FIG. 12A shows a preferred circuit implementation of this Envelope Detector B-6 in associated elements. In effect, such an Envelope Detector will permit slicing, or detecting, of all pulses at a level which tracks the read signal level and -automatically compensates for variations in heads, media, and amplifier gain variations in a manner which can be reset readily in the event of a head change. Such a detector will be appreciated as new and advantageous in such a di-bit servo detect arrangement, especially when coordinated with such an envelope reset means (and, also, with such a noise threshold means).

More particularly, as preferably implemented in the circuit of FIG. 12A, workers will noted that transistor U-16, connected between voltages $+V_{cc}$ and $-V_{cc}$, functions as an emitter-follower buffer adapted to apply the di-bit detection pulse to operational amplifier 310 across diode CR-5, partly compensating for the voltage drop, thereacross. This, together with the input R-C circuit (R75, C41), will enable the operational amplifier 310 to function as a voltage-follower buffer and allow use of relatively large-resistances selected for their "low-bias current" requirements. This envelope detector arrangement will be perceived to exhibit a relatively short capacitance-charge-tine (e.g., as compared with the hold-time required to discharge capacitor D-41) and a relatively small average working current (high resistance), as is desired.

Such head changes are accommodated through the control of an envelope reset unit B-9 (circuit also shown in FIG. 12A) while a noise threshold stage B-7 is also preferably provided to set a prescribed minimum signal amplitude at detector B-6 thus discriminating against noise signals, as known in the art. The preferred circuit implementation of B-7 is also shown in FIG. 12A, with an alternative (threshold clamp) implementation in FIG. 12C. In the circuit, the switching transducer U-16 for the Envelope Detector is preferably buffered as with capacitor or alternatively by an emitter-follower transistor configuration. An operational amplifier 310 will be seen as functioning as a voltage-following amplification transition stage to the comparator circuit B-8.

It will also be noted that a position error pulse ($V_R$) and a related "on track" signal are produced, here; in part by processing the mentioned "di-bit" signal together with a sample timing signal at a "Sample and Hold" unit B-10 and a related automatic gain control (AGC) unit B-11 constructed and functioning conventionally except as described herein.

Figure 12B:
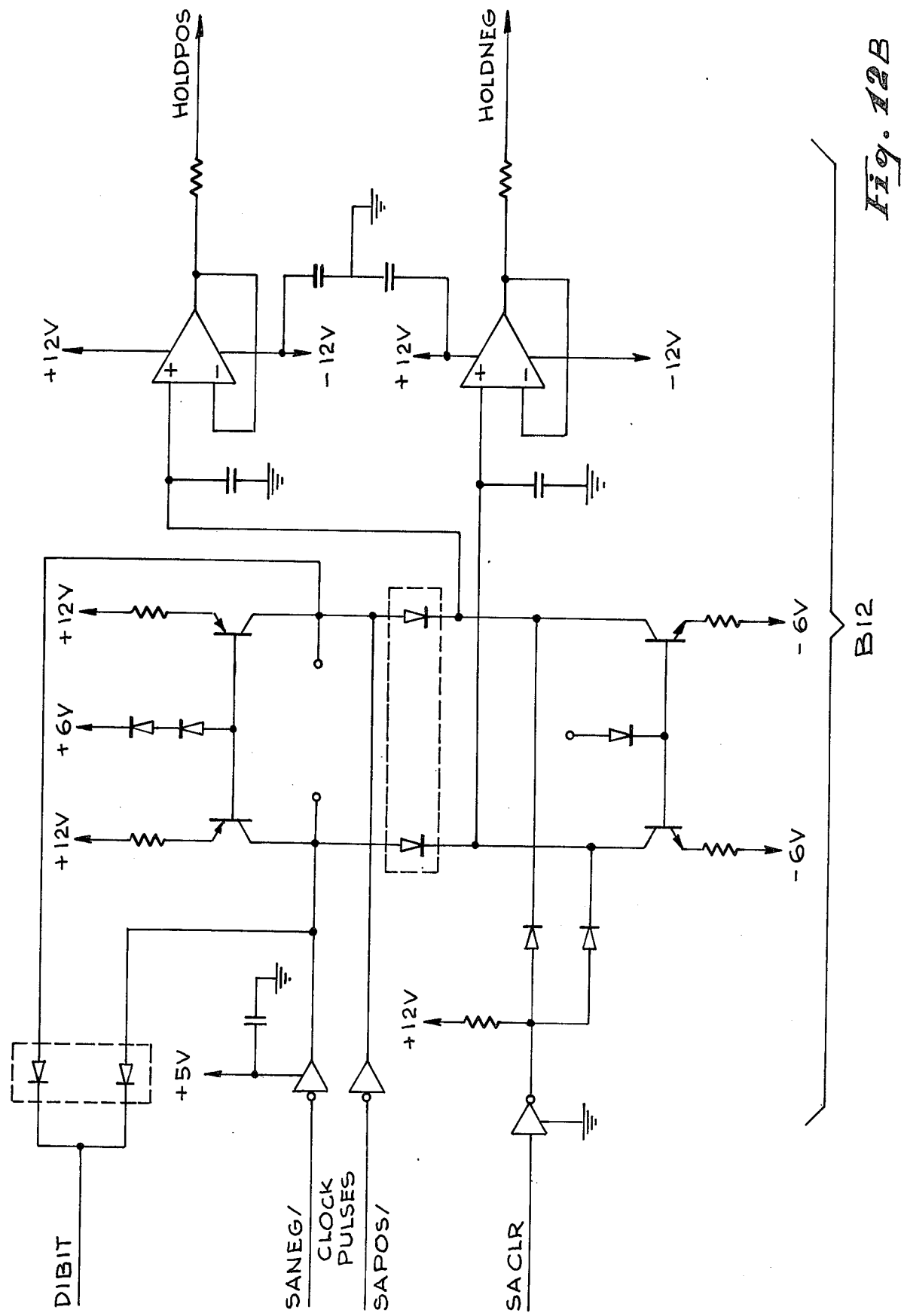
Figure 12:
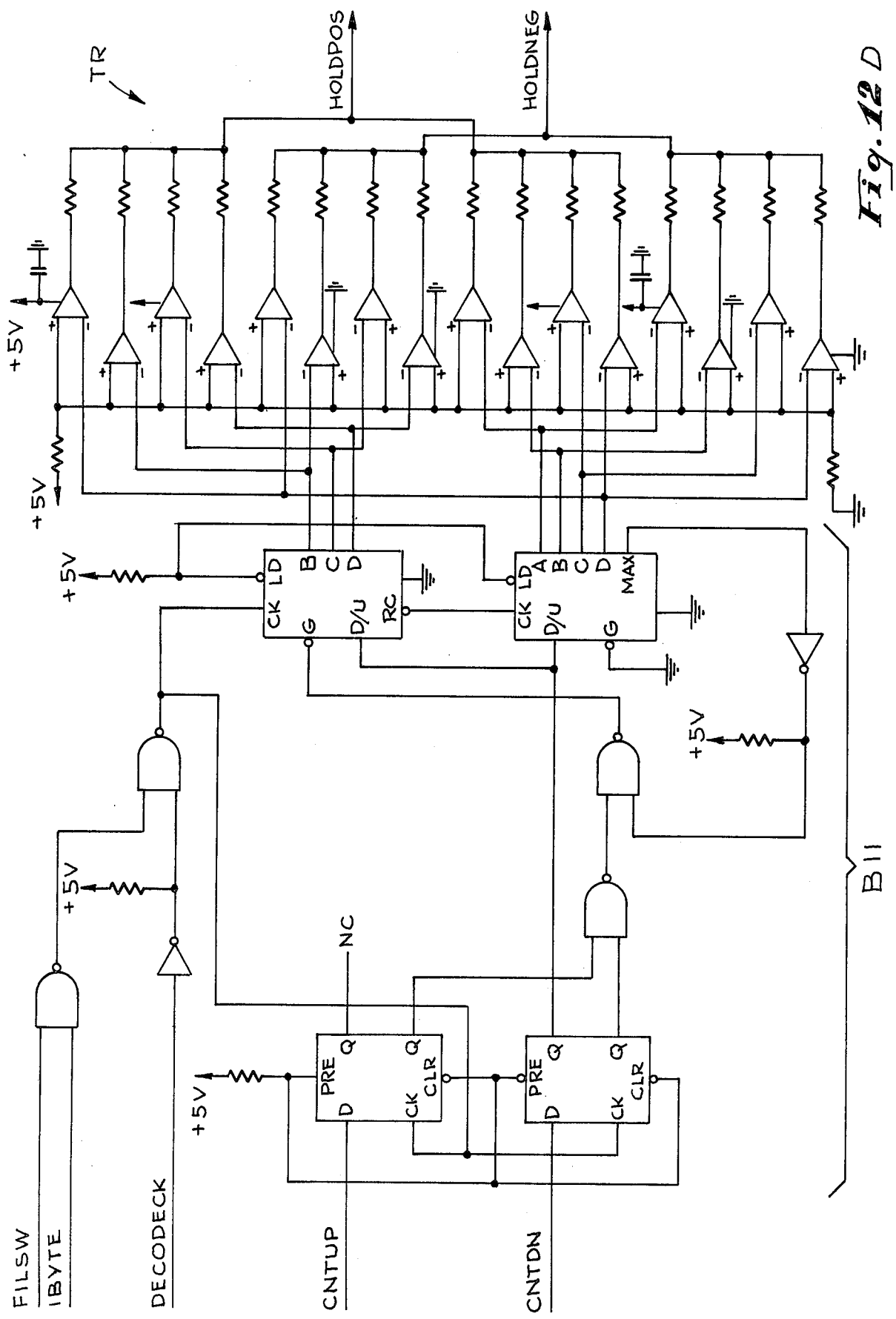

That is, the di-bit signal is also fed to a "Sample and Hold" unit B-10 along with sample timing pulses, as indicated at the input to fine servo detector stage 30' (see also FIG. 3A), Stage 30' will generally be understood as functioning to pick out and develop fine positioning signals. It will be remembered that only "odd" and "even" di-bits are to be accepted as "valid" fine servo signals, all other signals being essentially ignored in the operation of this detector. stage B-10 will select an odd or an even pulse, being "gated" (AND-ed) with a sample timing pulse. FIG. 12B shows the preferred circuit implementation for unit B-10.

The positive and negative pulses so selected are applied, along respective output lines, to DC-AGC (automatic gain control) unit B-11 which functions to normalize the signal amplitude and hold a prescribed signal level as understood in the art. These pulses are further transferred to Subtract unit B-13 adapted to generate a signal indicating fine positioning error (±) when the subject transducer gap is "off center", as known in the art. An "Add" stage B-12 is connected in feedback fashion from the output of B-11, re-entrantly, to control B-11, stage B-12 functions in the manner of Envelope detector B-6 to compensate for variations in "read gain", etc.; maintaining the sum of the two output signals at a constant [and equal to one another if the transducer gap is "dead-center"]. Workers will recognize the novelty and advantage of such an arrangement, particularly using AGC stage B-11 for normalizing signal amplitude as opposed, for instance, to a more conventional AGC circuit applied "upstream" of stage B-10 (the latter being somewhat slower, sacrificing response time, etc., as known in the art).

FIG. 8-B indicates in block diagram form the preferred AGC system, according to another feature of novelty. (See preferred circuit implementation in FIG. 12D). It will be observed that unlike conventional analog systems, this is a "fast, digital" AGC system. Now it will be appreciated that generally speaking the position indicating signal R will be expressed by $$V_R = KR$$

where K is some constant value, unchanging even between different sections of the track and different disks (note amplitude adjustment for PES signal also). That is, the amplitude of $V_R$ will be proportional to the degree of centering so that an exactly centered head will have $V_R = 0$ for the "fine adjust". Workers will recognize, as a feature of novelty the pair of graduated-resistance "trees" 8-VT, 8-VTT, providing a maximum impedance (minimum attenuation) at one end and a minimum impedance (maximum attenuation, maximum count) at the other end.

FIG. 12D indicates a preferred circuit implementation of stage B-11 including a pair of "D type" flip-flop units 7474, preferably provided on a common chip. Stage B-11 is connected at the input to a matrix of "logic trees" by way of a pair of counters (74191).

Figure 12E:
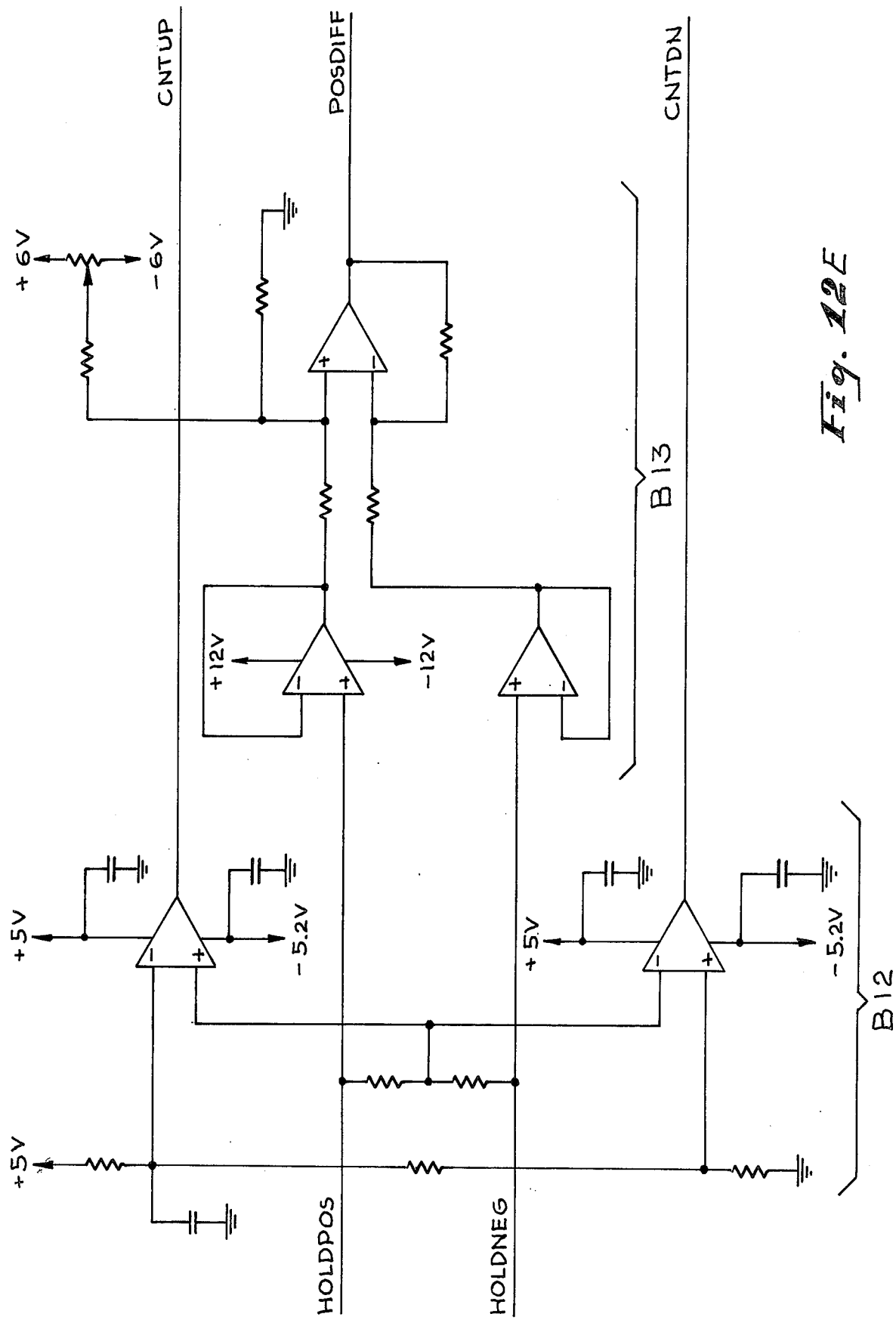
Figure 12F:
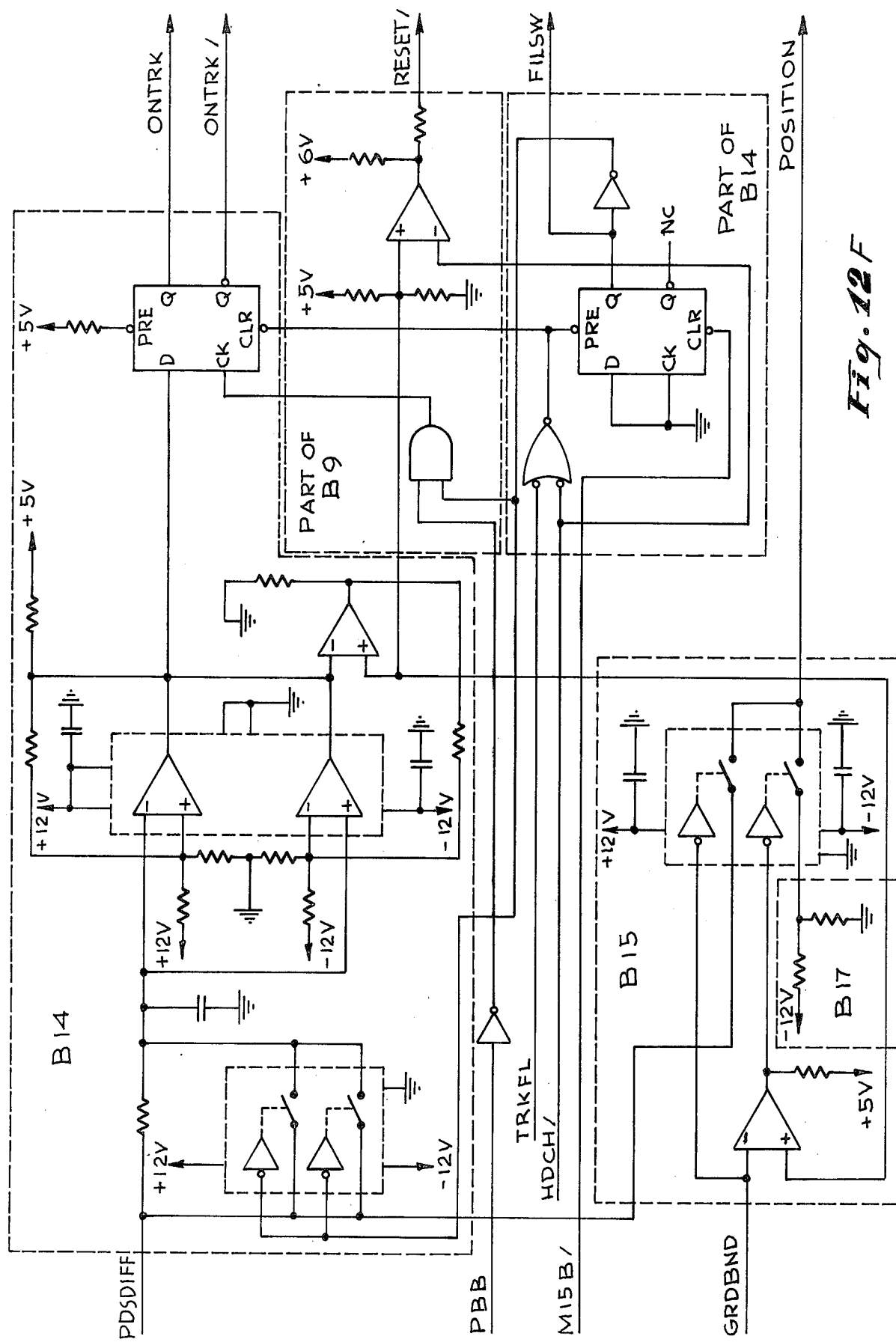

"On-track" detect unit B-14 is connected at the output of stge B-13 to detect the track alignment, while a position control stage B-15 is similarly fed by the output from B-13 functioning in a fashion of a variable time constant filter, (preferably implemented with FET switch means as indicated in FIG. 12F, for instance), B-14 will convert the output to an "on-track" signal, if the signal is within prescribed limits — otherwise no on-track signal will be generated.

Functioning with a fixed voltage from stage B-17 and a guard band signal, unit B-15 will effectively produce a position control signal $V_R$ applied to control the linear servo control unit in a fashion adapted to simulate what is written on the guard band of the disk. units B-12 and B-13 will be seen as implemented preferably by the circuitry of FIG. 12E, while FIG. 12F shows the circuitry preferred for units B-14, B-15 and B-17, as well as a portion of the circuits for B-9.

The circuit for Position Subtractor unit B-13 will be understood as generating a position error signal, PES, to be taken as the amplified difference in voltage between outputs from the voltage follower amplifiers 324.

In the circuit for B-12, (FIG. 12E) resistors R37, R36 form a summing network adapted to sum and test the combined (positive and negative) pulse values and test their sum against a prescribed constant value. The comparator unit in B-12 is formed, as workers will understand, by amplifiers 760 and their associated circuitry.

Figure 9A:
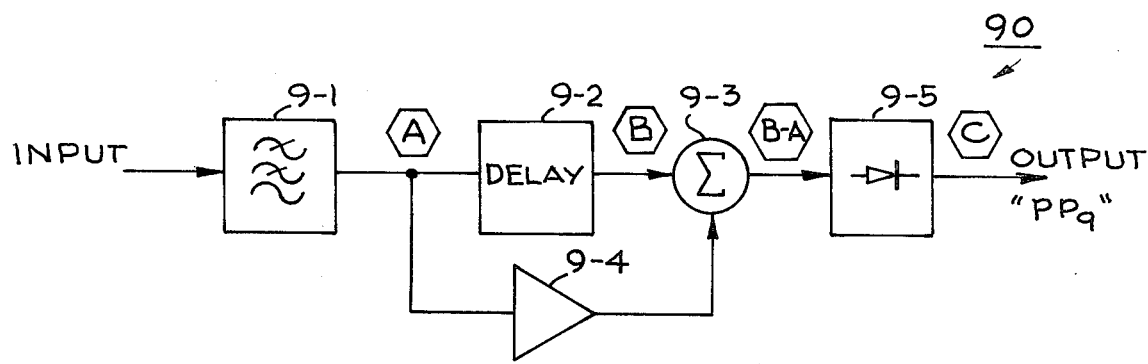
Figure 9B:
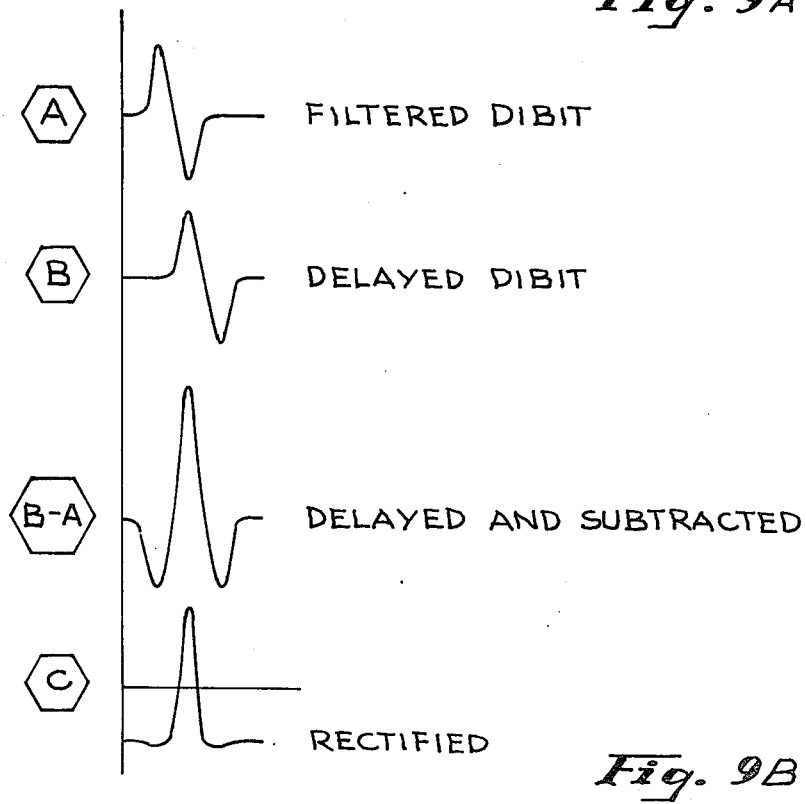

Di-bit detector unit (FIGS. 9A, 9B)

Figure 11A:
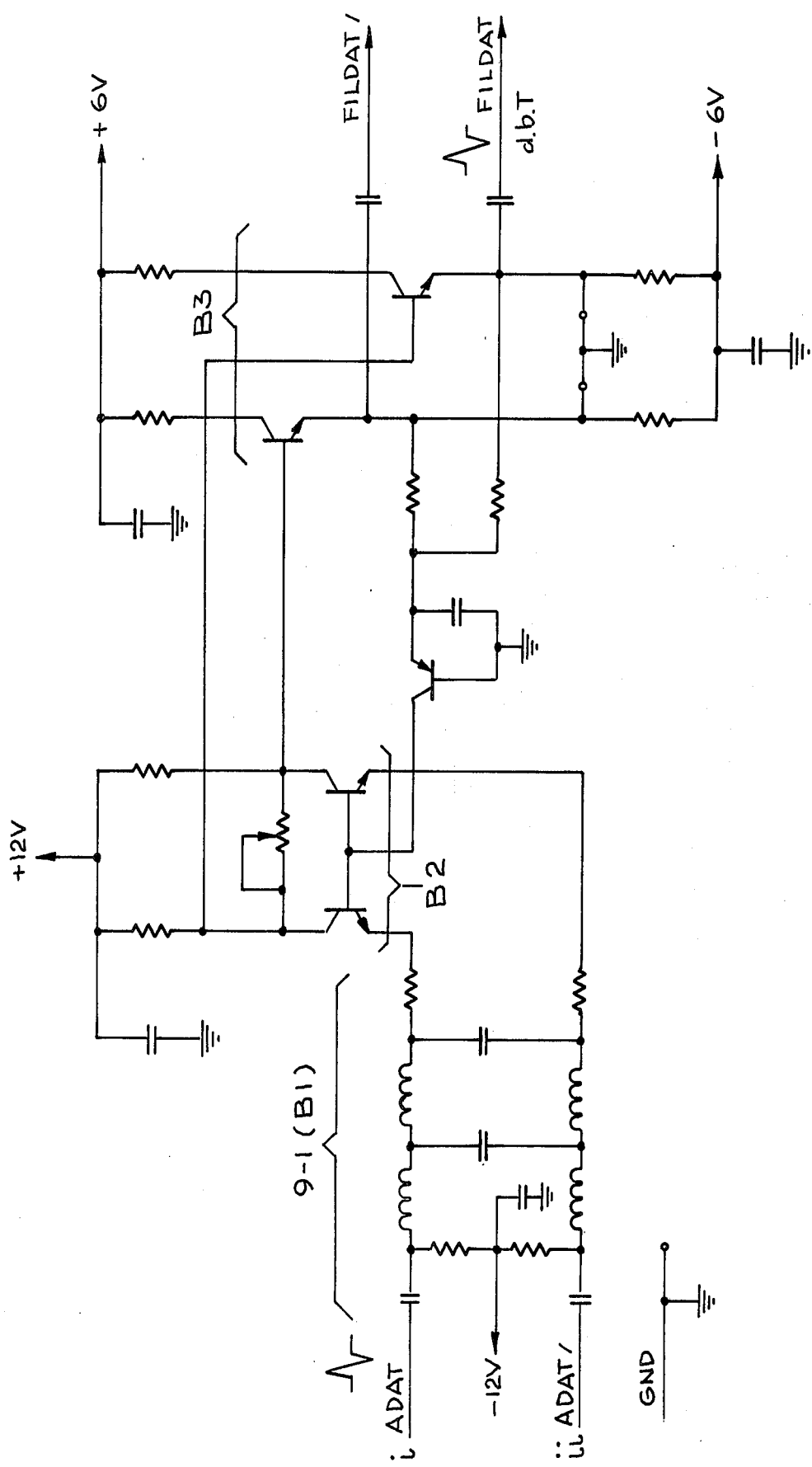
Figure 11B:
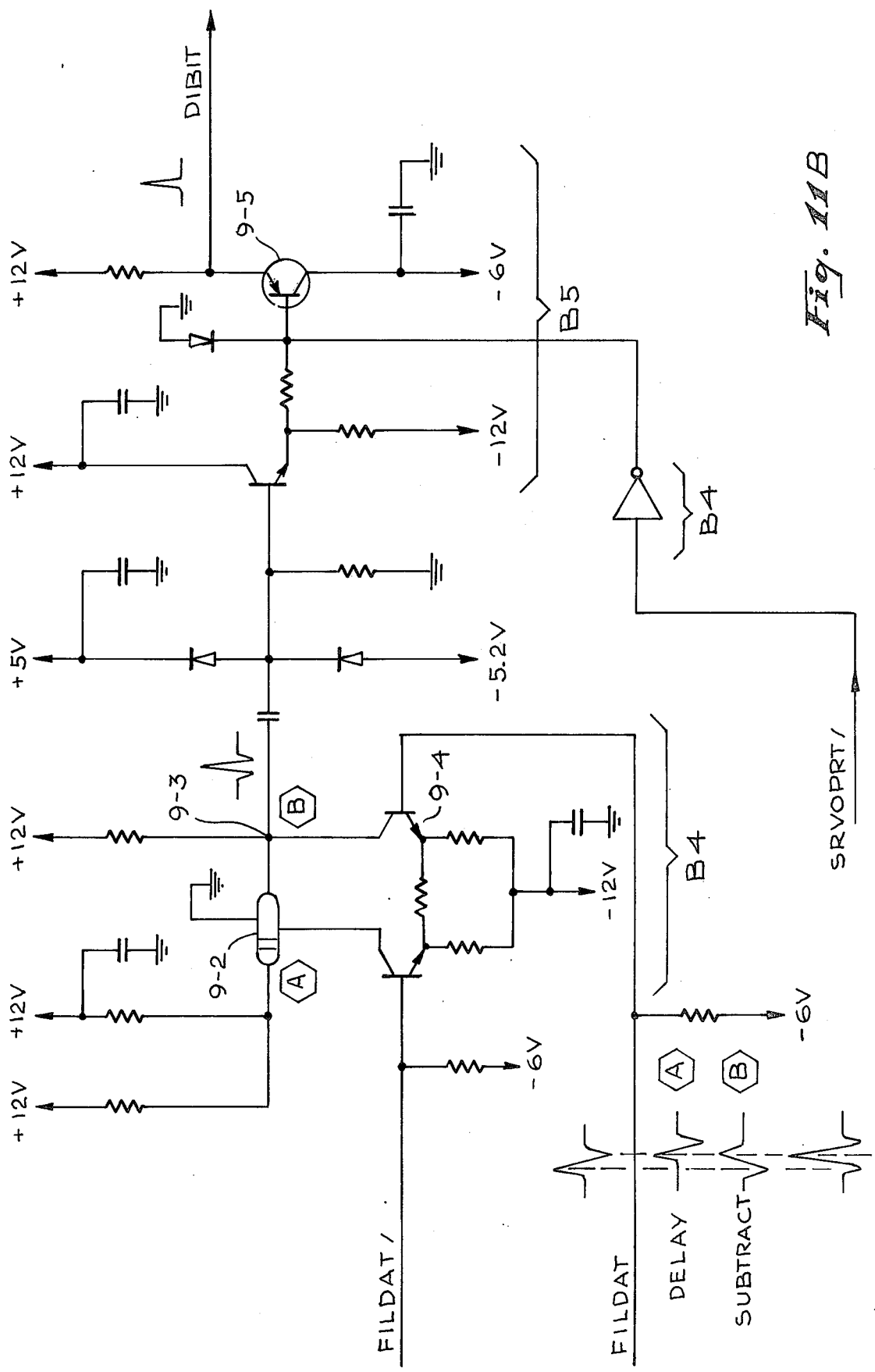

As shown in FIG. 8 an improvded di-bit detector unit 90 is also contemplated herein as another feature of novelty and comprising essentially a low-pass filter B-1, feeding a delay/subtract stage B-4 (preferably, via an amplification stage B-2 and emitter follower, or buffer, stage B-3). The output di-bit pulse DP-9 is applied preferably to a gate (clamp to zero) B-5. A preferred version of this di-bit detector embodiment is more particularly described, in block diagram form, with associated waveforms indicated in FIGS. 9A and 9B, with preferred implementing circuitry being indicated in FIGS. 11A, 11B.

That is, preferred arrangement for processing and simplifying such a sequence of di-bit servo pulses is (very schematically) indicated in FIG. 9A, with associated illustrative waveform shapes in FIG. 9B. This arrangement comprises a low-pass filter stage 9-1 adapted to accept the input pulses (i.e., di-bit pulses from R/W head) and produce a di-bit signal as indicated at A which has been filtered to match a prescribed waveform. This is (optionally) amplified, and is applied to a delay stage 9-2 adapted to "time-shift" the di-bit signal and delay it as indicated at signal B, applying this to a summing junction 9-3. The inverted version of the output from filter 9-1 is also applied (via negative inverter 9-4) to junction 9-3 to yield an output signal B-A. This signal is, in turn, coupled to a rectifier stage 9-5 generating a rectified uni-polar output signal. This output may be suitably buffered to produce final output C (e.g., as servo di-bit pulse).

More particularly, this signal is preferably applied to delay stage 9-2 (see FIG. 11B) via a differential amplifier B-2 (common-base transistor connection) and buffer stage B-3 (emitter-follower transistor). The Delay/Subtract stage B-4 is preferably implemented by a prescribed delay line 9-2 (preferably, a distributed L/C element, as known in the art), whose output is fed to a clamping point (summation terminal) 9-3, with Subtract (inverter) unit 9-4 connected between summing point 9-3 and the input to delay 9-2. This delayed, subtracted output signal (see B-A in FIG. 9B) will then be rectified at transistor circuit 9-5 (functioning as a "clamp-to-zero", with buffer transistor), by way of an emitter-follower stage including transistor U-28. The di-bit output or pulse PP-9 (see pulse C in FIG. 9B may now be used as the "servo signal", as indicated elsewhere. Such a di-bit detector arrangement will be recognized by those skilled in the art as new and advantageous. That is, workers will recognize some rather surprising results of such di-bit (embedded servo data) recording and detection, — in addition to those mentioned elsewhere. For instance, practically no increase in the cost or complexity of writing equipment is required. Also, little in the way of increased medium space is effectively needed. Further, read-out effectiveness is enhanced at little or no significant added cost.

Figure 10:
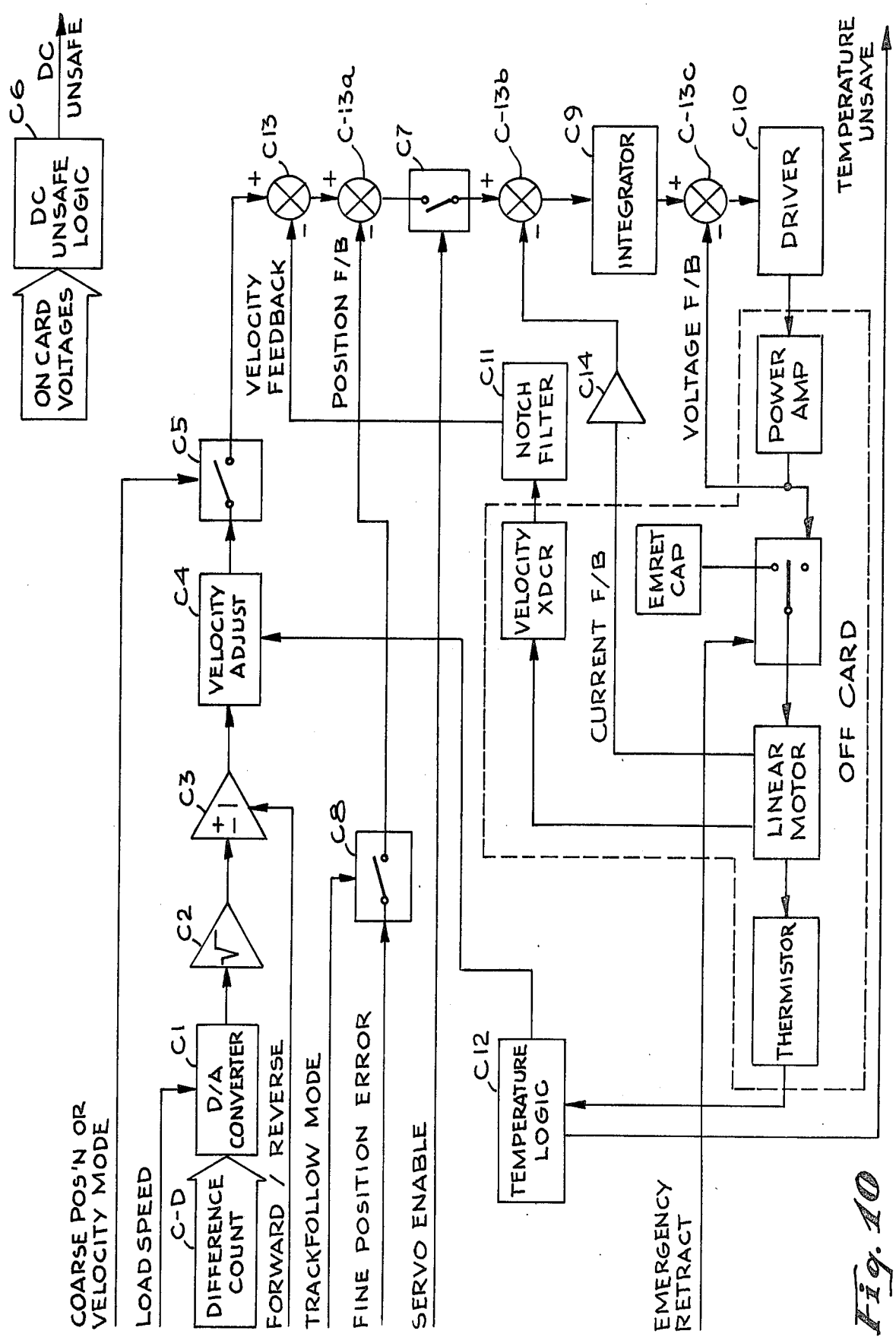

Servo control arrangement:

FIG. 10 is a block diagram of the preferred servo power/control arrangement, including the servo loop power amplifiers and linear motor controls. These elements are arranged to control the motion of the head carriage during "track-seek" (Coarse Positioning) and are also adapted to maintain the heads "on track", in the track-following mode. Here, it will be assumed that a relatively conventional difference count signal, C-D is applied (representing the track difference, or cylinder difference count, e.g., covering 500 tracks). Signal C-D comprises a current value proportional to the track-difference count, preferably and is applied to a digital-analog converter C-1 adapted, under control of a load speed signal, to apply a signal to a "square root" stage C-2. C-2 will generate a signal voltage proportional to the square root of this input (current) signal (that is, proportional to the square root of the "distance to go", to the target track. This signal will be applied to the Velocity Adjust stage C-4 via a Forward/Reverse Control stage C-3, the latter adapted to determine whether "forward" and "reverse" actuator motion is to be commanded. Unit C-3 may be viewed as a selective inverter stage adapted to automatically convert the output from unit C-2 upon reception of a "reverse-actuate" command.

According to another salient feature of novelty herein, Velocity Adjust stage C-4, with other associated elements, is adapted to operate the linear actuator motor in a prescribed "two-stage" velocity mode — that is, initially, and normally, at "maximum velocity" (maximum motor acceleration giving maximum actuator velocity) during "track-seek" — this high speed mode nominally "over-loading" the linear motor for many ordinary actuator motions, some of which are extremely brief and will never actually develop problematical heat levels in the motor. The system reverts to a second, "Low Speed", mode if, and only if, motor temperature is sensed as having risen above the "maximum safe operating temperature" ($T_{max}$), as detected by a suitable means, with a responsive signal being applied to the Velocity Adjust stage C-4.

Appropriate brake means will then be applied to decelerate the motor from East to Slow mode — except that, preferably, during an intermediate transition mode the motor will normally "coast" for a period. Thus, a thermistor, or like "over load temperature" detector, will be understood as coupled to monitor motor temperature and to apply an appropriate indicating signal — e.g., via a logic stage D-12 — to control Velocity Adjust C-4 to be automatically switched to the velocity-derating mode. The thermistor, in effect, provides a "temperature governor" for the linear motor. Velocity Adjust stage C-4 will be also seen and understood to be operated like a manual impedance (e.g., trim pot) to permit selected velocity settings to be manually entered into the system, and changed at will. Similarly, a velocity transducer will be understood as operating to feed a velocity feedback signal to a summing network C-13 via a filter C-11.

Figures 1, 13A:
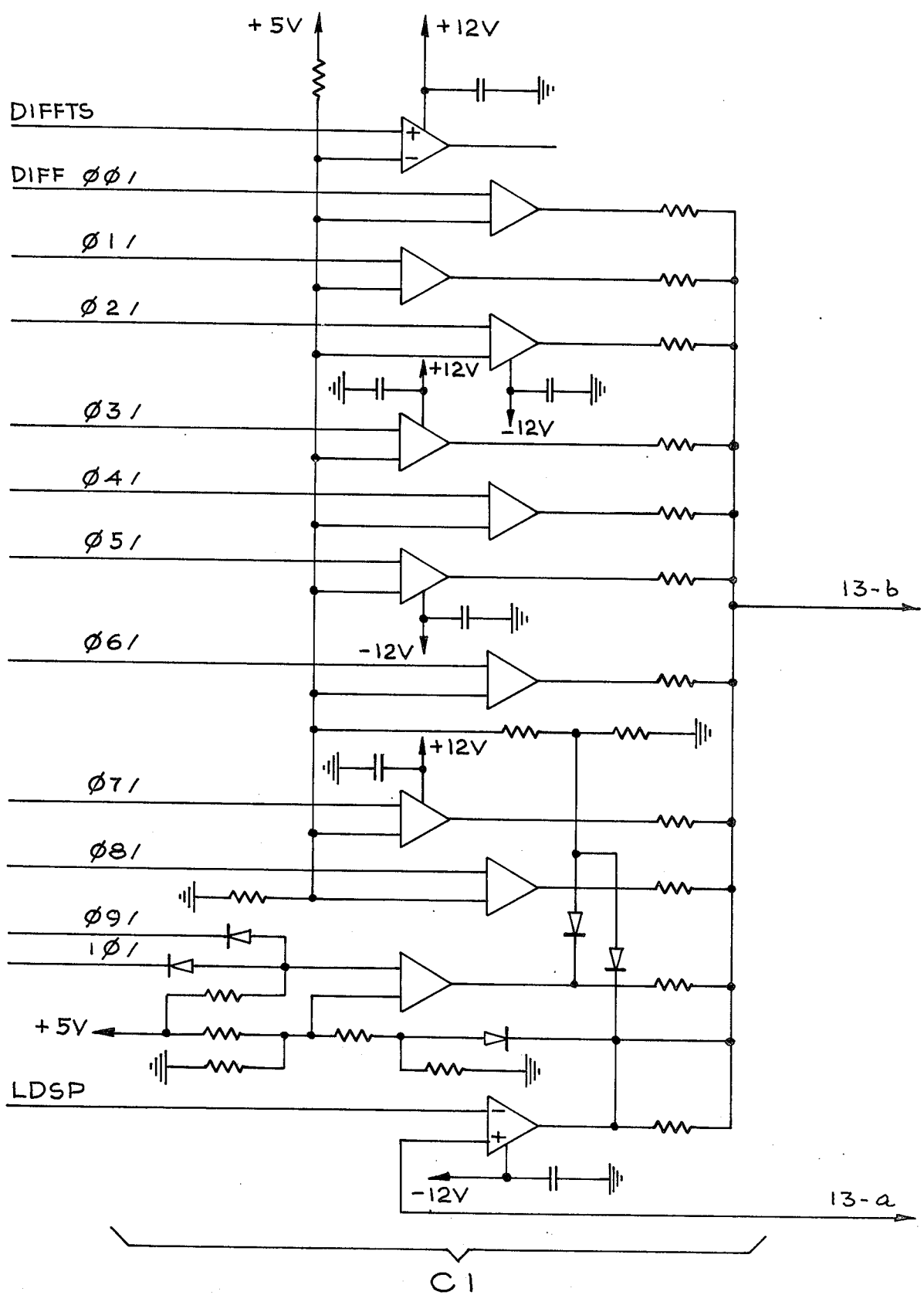
Figures 2, 13A:
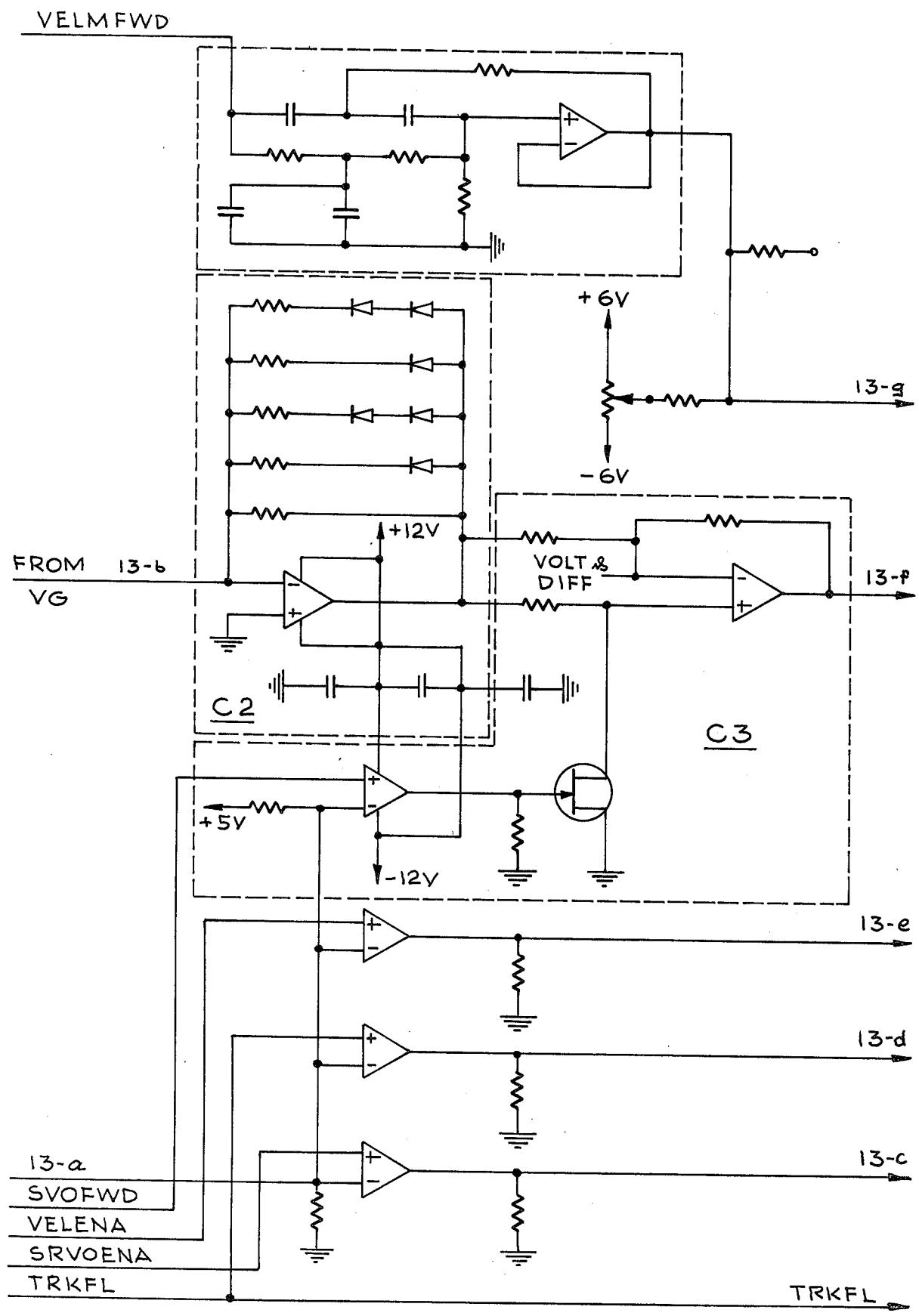
Figures 3, 13A:
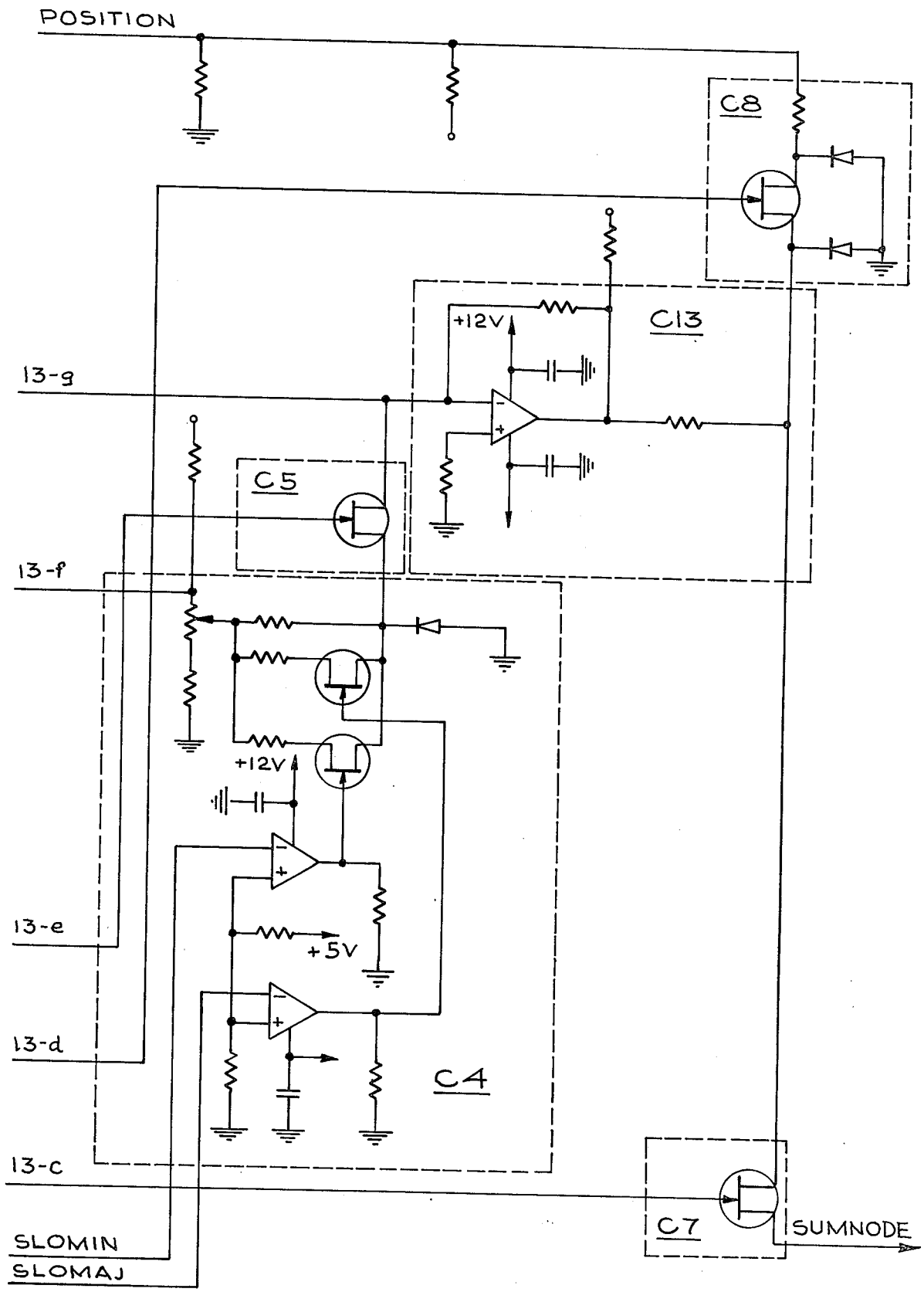
Figures 2, 13B:
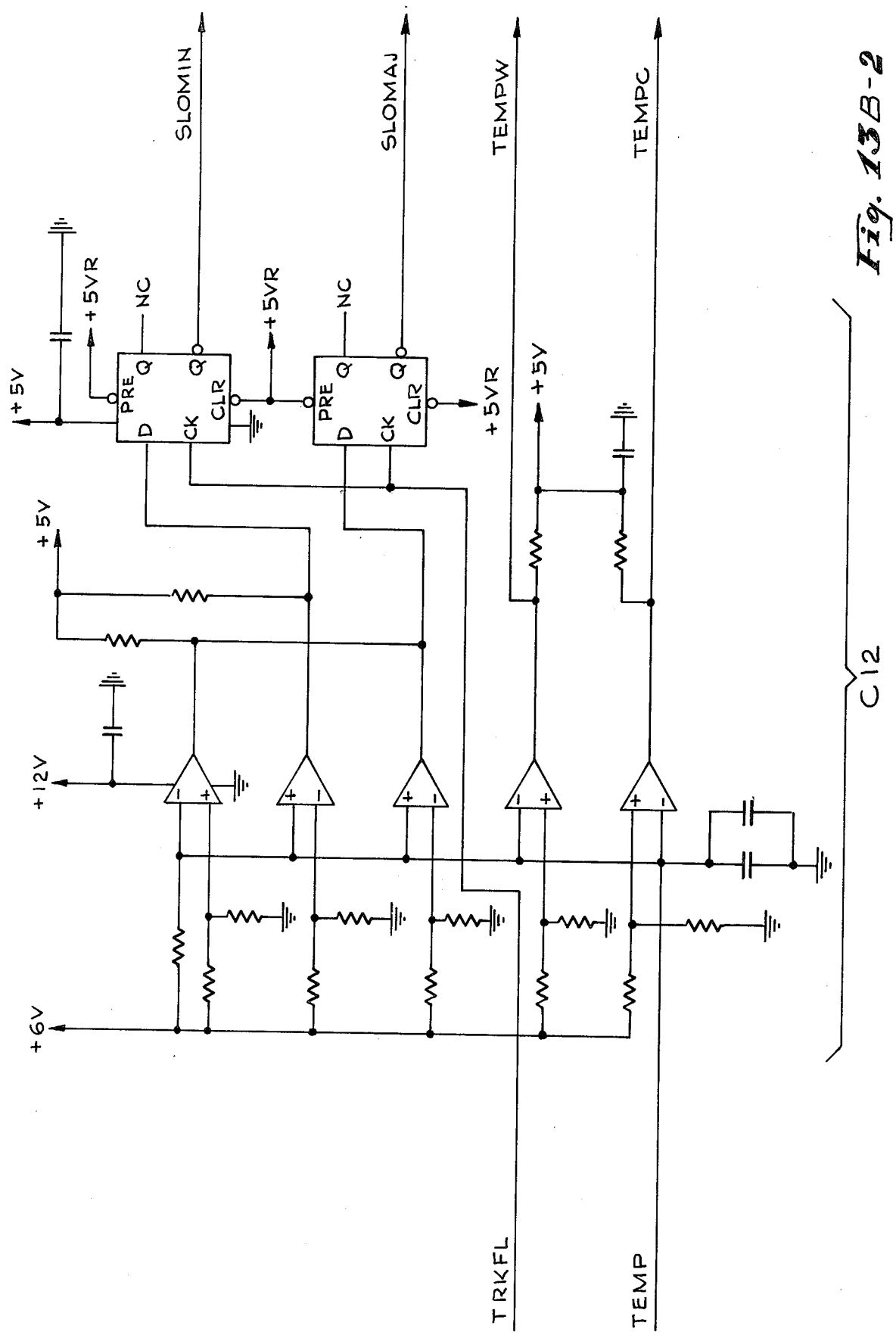
Figure 14:
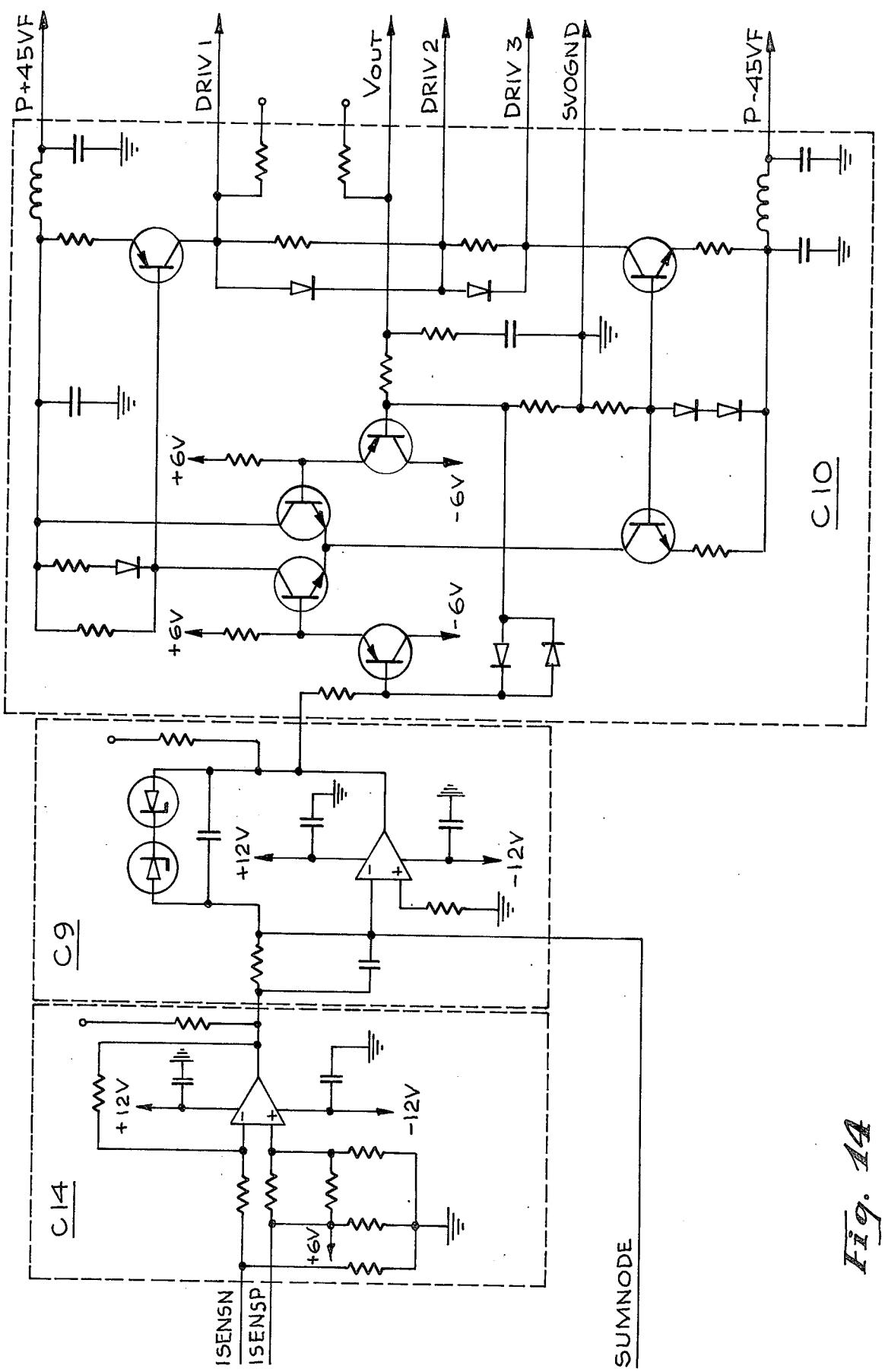

FIGS. 13A, 13B indicate the preferred schematic circuit embodiment of the salient elements of FIG. 10, according to the features described. Thus, Velocity Adjust circuit C-4, as seen in FIG. 13A, functions to selectively generate weaker velocity command to be applied to the linear motor upon reception of the "temperature over-load" signal.

In summary, by this multi-stage "normally-overloaded" motor control, the actuator motor will be normally run at "maximum velocity" regardless of the risk of over-load, over-heating, etc.; however, being continually monitored for over-load condition (temperature $T_{max}$) — and it will be decelerated into a slower, safer low-velocity mode once the critical parameter (motor temperature or other factor as selected by the control designer) is reached. Workers will recognize that such a "normally-overloaded" mode of operating a linear actuator motor will result in much faster, more efficient "seek" operations than with ordinary ("random seeking") arrangements which typically always operate the linear motor under "worst case" conditions — this despite the fact that most "seek" excursions executed are so brief as to be incapable of developing overload — heat (even if the motor is "supper energized"). That is, this two-stage velocity control may be contrasted with more conventional operation whereby the (average RMS) motor current is set by reference to a worst-case time (indicates total power to the motor) which may be unrealistically long and be unrelated to actula overload-heat. Now over-heating is more directly related to the strength of the motor bobbin and to motor failure compensates for such typical ameliorating conditions as motor-cooling, ultra-brief operations, etc., as workers will appreciate.

Of course, this multi-stage velocity signal output from unit C-4 will not be applied to the linear motor except during "Coarse Positioning", as invoked by operation of switch C-5, as known in the art. Also, this motor-velocity control signal will be, preferably, applied through a summing junction C-13 where it is compared with the actual detected motor velocity (via velocity transducer, and filter C-11 in a velocity feedback loop). This will (conventionally) generate an error signal representing velocity difference which the system will automatically follow (in the positive or negative direction) to seek a "null", indicating that the "commanded velocity" is now the "detected velocity". Such summing circuits are well known in the art and will not be elaborated here, except to note that C-13 circuit is shown in FIG. 13A as a preferred example.

Coarse Positioning switch C-5 will operate exclusively with Fine Positioning switch C-8 (so that the linear motor is either operating under a Coarse Postioning or a Fine Positioning control — the Fine Positioning control never invoking the mentioned high speed mode) as is well known in the art. An emergency, or "failure" switch C-7 will be provided to be operated in the event of a "failure condition" and/or as a means of initially energizing the motor control circuit.

Summing junction C-13, together with integrator stage C-9, pluse summing junction C-13C and output driver stage C-10 and an appropriate power amplifier, will all be operated — in conjunction with the indicated voltage feedback and current feedback loops to the respective summing junctions — as a continuous current source. This source will be understood to normalize the commanded voltage level and current level of the control signals (to the linear motor), as is known in the art.

Figure 15A:
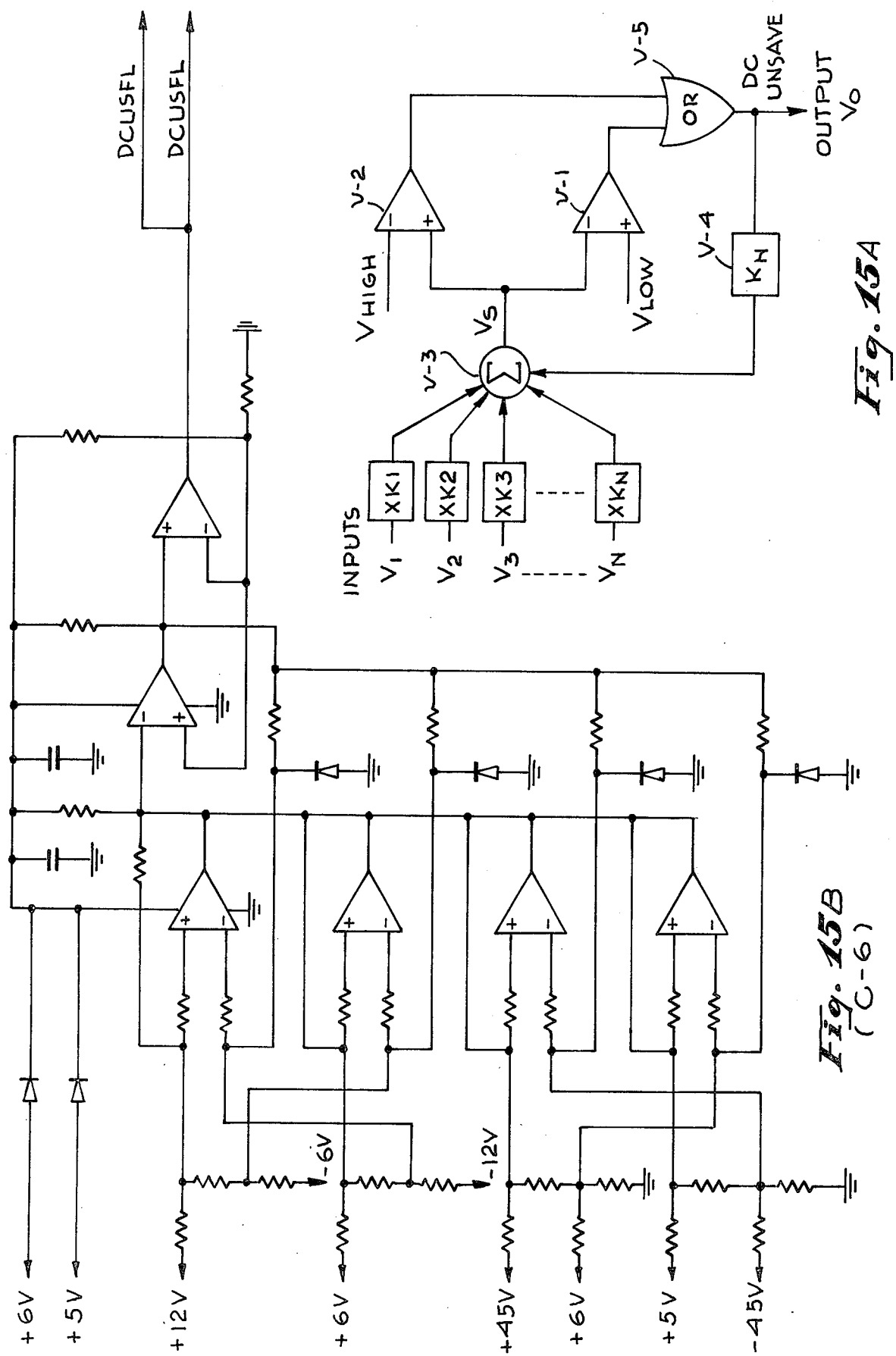
FIG. 15A depicts the block diagram of a "DC Unsafe" subsystem of the arrangements in FIGS. 3A and FIG. 8, with FIG. 15B giving the preferred circuit therefor.

DC unsafe system:

According to another feature, a "DC unsafe" system (suggested in FIG. 10) is provided, the system being indicated in block diagram form in FIG. 15A, with preferred circuit implementation in FIG. 15B. The DC unsafe circuit will be understood as generally adapted to monitor a number of power supply voltages and to automatically detect overall voltage abberations in a "weighted manner". That is, an abnormal condition occurring on a large number of independently-variable supply voltage inputs ($V_1, V_2 \ldots V_N$) can be detected, here, by generating a linear combination of these variables (see $V_S = K_1V_1 + K_2V_2 + \ldots K_NV_N$) and then comparing this weighted-sum ($V_S$) with normal operating limits (between $V_{low}$ and $V_{high}$).

The sensitivity of this weighted sum $V_S$ to changes in each independent variable can be adjusted through appropriate choice and/or adjustment of the value of the weighting constants $K_1, K_2 \ldots K_N$; — this providing the desired relative sensitivity in each and every one of the constants and their associated inputs. These collective inputs are summed at summing junction U-3 and the summed output $V_S$ is applied to the positive input of a first comparator U-1 and the negative input of a second like comparator U-2, respectively. The comparator limits of $V_{high}$, $V_{low}$, respectively may be set as desired and the threshold for the comparison may be conventionally adjusted (e.g., with a divider network as known in the art). The output of these comparators is applied through an OR gate U-5 to provide the weighted-sum indication $V_O$ which will indicate the "abnormal" situation (unsafe) or the "normal" (safe) state, as desired.

As an option, a feedback loop from gate U-5, including a latch-up $K_H$, is fed-back to the summing junction U-3. As workers in the art will discern, this improvement can provide a latch-up function even when "marginal values" of output $V_O$ occur, thus providing a quasi-hysteresis in the system.

Conclusion:

It will be understood that the preferred embodiments described herein are only exemplary and that the invention is capable of many modifications and variations, in construction, arrangements and use without departing from from the spirit of the invention as claimed herein. For example, the means and methods disclosed herein are also applicable to flexible disk files and other related systems wherein recording transducers are automatically scanned over a prescribed excursion distance at high speed and under comparable control. Other modifications may also by invoked; for instance, a plurality of actuator systems and associated servo control systems like that indicated may be used with any one disk file, each said control system incorporating one or several of the indicated features of novelty and advantage herein.

Since the foregoing examples of the invention are only illustrative, it will be appreciated that this invention is to be considered as including all the possible modification and variations coming within its scope and spirit as represented by the appended claims.

What is claimed is:

1. In an improved magnetic recording system including multi-track magnetic records, at least a portion of each track thereon being recorded in "di-bit" mode, the combination therewith comprising:
   a di-bit detection array, said array including filter means adapted to essentially filter the detected di-bit pulse, rejecting "non-standard" waveforms and delay/subtract means adapted to delay portions of this pulse and perform a summation on the original and the delayed pulse forms, with associated polarity-rectification to generate a uni-polar output representing each di-bit transition recorded.

2. The combination as recited in claim 1, wherein said detection array comprises a low-pass filter input stage followed by a delay/subtract stage and a clipping stage.

3. The combination as recited in claim 1, wherein said uni-polar di-bit outputs are also electronically screened by an envelope detector stage and an associated level detect stage.

4. The combination as recited in claim 1, wherein is also included actuator motor means and associated motor control means adapted to automatically "over-load" the motor and realize maximum acceleration therefrom normally, while automatically decelerating the motor once an over-load condition is sensed.

5. The combination as recited in claim 4, wherein said motor control means includes temperature monitor means adapted to sense a prescribed critical motor temperature and to responsively cause said control means to invoke said motor deceleration.

6. The combination as recited in claim 9, wherein there is also included a "DC Unsafe" arrangement adapted to monitor supply voltages and automatically indicate overall voltage aberrations, this arrangement comprising an array of weighted-impedance inputs, one from each supply voltage, plus compare means adapted to generate an output reflecting any said aberration in a weighted fashion, said compare means including maximum standard voltage and minimum standard voltage inputs adapted to set the range of said aberrations.

* * * * *

UNITED STATES PATENT AND TRADEMARK OFFICE
CERTIFICATE OF CORRECTION

PATENT NO. : 4,149,200
DATED : April 10, 1979
INVENTOR(S) : Daniel C. Card

It is certified that error appears in the above-identified patent and that said Letters Patent are hereby corrected as shown below:

Abstract, line 9, change "control hard-positioning" to --controls head-positioning--.
Col. 4, line 33, change "disk(" to --disk)--.
Col. 5, line 9, change "#1" to --#4--;
        line 13, change "Convertionally" to --Conventionally--.
Col. 6, line 24, change "[ 37 fine"," to --[ "fine",--;
        line 39, change "head" to --Head--.

Col. 8, line 30, change ""remove"" to --"remote"--;
        line 38, change "$I_2'$," to --$T_2'$,--.
Col. 9, line 34, change "pulse" to --pulses--;
        line 43, change "a" to --to--;
        line 58, change "in" to --is--.
Col. 10, line 5, change "heat" to --head--;
        line 20, change "noted" to --note--;
        line 65, change "stage" to --Stage--.
Col. 11, line 9, change ""Add"" to --"ADD"--;
        line 12, change "detector" to --Detector--;
        line 48, change "stge" to --stage--;
        line 60, change "units" to --Units--.
Col. 12, line 52, change "9B" to --9B)--.
Col. 13, line 18, change "and" to --or--;
        line 40, change "East" to --Fast--;
        line 61, after "generate" insert --a--.

UNITED STATES PATENT AND TRADEMARK OFFICE
CERTIFICATE OF CORRECTION

PATENT NO. : 4,149,200
DATED : April 10, 1979
INVENTOR(S) : Daniel C. Card

It is certified that error appears in the above-identified patent and that said Letters Patent are hereby corrected as shown below:

Col. 14, line 12, change ""supper" to --"super--;
         line 17, change "actula" to --actual--;
         line 49, change "pluse" to --plus--.
Col. 15, line 39, change "by" to --be--.
Col. 16, line 36, change "9" to --4--.

Signed and Sealed this

Fourth Day of September 1979

[SEAL]

Attest:

LUTRELLE F. PARKER

Attesting Officer     Acting Commissioner of Patents and Trademarks